Figure 1:
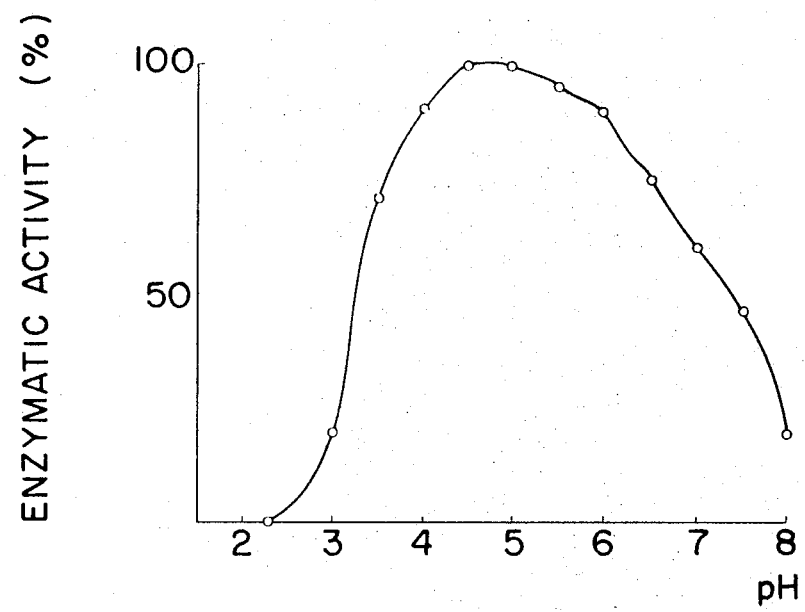

United States Patent [19]

Koaze et al.

[11] 3,868,464

[45] Feb. 25, 1975

[54] PRODUCTION OF MALTOSE WITH AMYLASES PRODUCED BY STREPTOMYCES

[75] Inventors: Yoshihisa Koaze; Yutaka Nakajima, both of Tokyo; Hidemasa Hidaka, Yokohama; Tomizo Niwa, Kawasaki; Takashi Adachi, Yokosuka; Kenji Yoshida, Kawasaki; Jiro Ito; Taro Niida; Takashi Shomura, all of Yokohama; Masahiro Ueda, Kawasaki, all of Japan

[73] Assignee: Meiji Seika Kaisha, Ltd., Tokyo, Japan

[22] Filed: July 26, 1973

[21] Appl. No.: 382,752

Related U.S. Application Data

[62] Division of Ser. No. 190,962, Oct. 20, 1971, Pat. No. 3,804,717.

[30] Foreign Application Priority Data

Oct. 27, 1970  Japan.............................. 45-93951
Dec. 25, 1970  Japan.............................. 45-11775
July 5, 1971   Japan.............................. 46-48772

[52] U.S. Cl..................... 426/48, 426/52, 426/217, 195/31 R
[51] Int. Cl............................................. C13k 7/00
[58] Field of Search................. 195/31 R, 65, 66 R; 426/48, 52

[56] References Cited
UNITED STATES PATENTS 3,616,221   10/1971   Takasaki.......................... 195/66 R

OTHER PUBLICATIONS

Chemical abstracts, Vol. 72, 41717u. (1970).

*Primary Examiner*—Lionel M. Shapiro
*Attorney, Agent, or Firm*—Larson, Taylor & Hinds

[57] ABSTRACT

This invention relates to a process of producing a new amylase by cultivating a strain of the particular seven species of Streptomyces; Streptomyces albus, Streptomyces aureofaciens, Streptomyces hygroscopicus, Streptomyces hygroscopicus var. angustomyceticus, Streptomyces viridochromogenes, Streptomyces flavus and Streptomyces tosaensis. These new amylases produced by the above particular species, respectively have some enzymatic activities and characteristics which are much more useful and advantageous in producing a higher yield of maltose from starch and amylose, as compared to the use of the known amylases. The starch hydrolyzate which is obtained by reacting the new amylase with starch in aqueous dispersion contains a predominant proportion of maltose and is useful as a natural sweetening material. Further, this starch hydrolyzate mainly composed of maltose is converted into a mixture of sugar alcohols mainly composed of maltitol by hydrogenating in the presence of a nickel catalyst.

6 Claims, 7 Drawing Figures

PRODUCTION OF MALTOSE WITH AMYLASES PRODUCED BY STREPTOMYCES

This is a division of application Ser. No. 190,962 filed Oct. 20, 1971, now U.S. Pat. No. 3,804,717.

This invention relates to a process for the production of a new amylase having enzymatic activities and characteristics by cultivating a strain of some Streptomyces species to produce and accumulate a new amylase in the culture medium employed and then recovering the new amylase from the culture medium. This invention further relates to the production of maltose by reacting the new amylase so produced with starch substrate, and furthermore this invention relates to the production of maltitol by reacting the new amylase so produced with starch substrate, thus producing maltose and then hydrogenating this maltose in the process of a nickel catalyst.

We, the inventors, have found that when a strain belonging to some Streptomyces species, more particularly Streptomyces albus, Streptomyces aureofaciens, Streptomyces hydroscopicus, Streptomyces hygroscopicus var. angustomyceticus, Streptomyces viridochromogenes, Streptomyces flavus and Streptomyces tosaensis nov. sp., or natural artificial variants or mutants thereof is cultivated in a culture medium comprising known carbon sources and nitrogen sources usually available for the culture of actinomycetes under aerobic conditions, there is produced and accumulated in the culture medium a new amylase having such enzymatic activities and characteristics that its optimum pH is in the range of 4.5–5.0 for starch substrate, the limit in the hydrolysis of starch by this enzyme is no less than 75% of the theoretical maltose and a ratio of glucose to maltose produced from starch by the action of this enzyme is no more than 0.06:1 by weight, and also that the new amylase of Streptomyces as produced and accumulated in the culture medium may be recovered therefrom in a known manner. We have now made the present invention on the basis of the above discovery.

According to a first aspect of the present invention, therefore, we provide a process for the production of a new amylase by the cultivation of Streptomyces, which comprises cultivating a strain of Streptomyces albus, Streptomyces aureofaciens, Streptomyces hygroscopicus, Streptomyces hygroscopicus var. angustomyceticus, Streptomyces viridochromogenes, Streptomyces flavus and Streptomyces tosaensis nov. sp., under aerobic conditions in a culture medium containing known carbon sources and nitrogen sources to produce and accumulate in the culture medium an amylase having such enzymatic activities and characteristics that the pH of the optimum activity is in the range of 4.5–5.0 for starch substrate, the limit in the hydrolysis of starch by this enzyme is no less than 75% of the theoretical maltose, and the ratio of glucose to maltose produced from starch by the action of this enzyme is no more than 0.06:1 by weight; and then recovering the amylase from the culture medium in a known manner.

For the production of the new amylases according to the first aspect of the present invention, we have fround it preferable to employ and cultivate any one of the particular strains of Streptomyces which are listed in Table 1 below.

TABLE 1

| Strains | F.R.I. deposit number* | ATCC. deposit number** |
|---|---|---|
| Streptomyces tosaensis SF-1085 [this strain was first isolated from soil and discovered by the present inventors; and its properties are described later in detail.] | 601 | 21723 |
| Streptomyces hygroscopicus SF-1084 [this strain is coincident with Streptomyces hygroscopicus as described in Waksman's "The Actinomycetes" Vol. 2 (1961) and in the "Applied Microbiology" Vol. 10, pp. 258–263 (1962)] | 602 | 21722 |
| Streptomyces viridochromogenes SF-1087 [this strain is coincident with Streptomyces viridochromogenes as described in Wakesman's "The Actinomycetes" Vol. 2 (1961) and in the "Journal of Bacteriology" Vol. 85, pp. 676–690 (1963)] | 603 | 21724 |
| Streptomyces albus SF-1089 [this strain is coincident with Streptomyces albus as described in Waksman's "The Actinomycetes" Vol. 2, (1961)] | 604 | 21725 |
| Streptomyces flavus | 605 | — |
| Streptomyces aureofaciens | 606 | — |
| Streptomyces hygroscopicus Var. angustomycetes | 607 | — |

In Table 1:
*F.R.I. is an abbreviation of "Fermentation Research Institute," Agency of Industrial Science & Technology of Ministry of International Trade & Industry of Japan, residing in Inage, Chiba City, Japan.
**ATCC. is an abbreviation of American Type Culture Collection, Washington D.C., U.S.A.

The above specified strains can efficiently produce and accumulate the new amylases of the abovementioned characteristics in a culture medium when they are cultivated in a known manner under aerobic conditions.

According to an embodiment of the first aspect of the present invention, therefore, we provides a process for the production of a new amylase which comprises cultivating a strain of Streptomyces aureofaciens F.R.I. 606, Streptomyces flavus F.R.I. 605, Streptomyces hygroscopicus F.R.I. 602, Streptomyces hygroscopicus var. angustemyceticus F.R.I. 607, Streptomyces viridochromogenes F.R.I. 603, Streptomyces albus F.R.I. 604 and Streptomyces tosaensis nov. sp. F.R.I. 601, in a culture medium containing known carbon sources and nitrogen sources under aerobic conditions to produce and accumulate in the culture medium an amylase of such enzymatic characteristics and activities that the pH of the optimum activity is in the range of 4.5–5.0 for starch substrate, the limit in the hydrolysis of starch by this enzyme is no less than 75% of the theoretical maltose and the ratio of glucose to maltose as produced from starch by the hydrolytic action of this enzyme is no more than 0.06:1 by weight; and then recovering said amylase from the culture medium in a known manner.

By the above-mentioned term "the limit in the hydrolysis of starch by this enzyme is no less than 75% of the theoretical maltose" is meant that when a sufficient amount of the new amylase of the present invention is reacted with starch substrate in the optimum pH range and at optimum temperature range, the extent of the hydrolysis of the starch reaches a limit at which the hydrolysis of starch ceases, where no less than 75% of the maltose theoretically obtainable from the starch substrate has been formed provided that the quantity of the reducing sugars released from the starch through said hydrolysis is determined by the Somogyi's titration method and is calculated as maltose.

The particular enzymatic activities and characteristics of the new amylases of streptomyces as produced by the process of the present invention are summarized in Table 2 below. For comparison, properties of some known amylases of bacteria, fungi, plant and animals are shown together in Table 2.

the result that the process of producing maltose from starch can be operated very much smoothly and the yield of maltose can remarkably be improved as compared to the cases of using the prior known amylases.

As *Streptomyces tosaensis nov. sp.* (deposited in F.R.I. under F.R.I. deposit number 601 and in ATCC. under ATCC. deposit number 21723, respectively) is a new microorganism which was isolated from soil at the first time by the present inventors, microbiological properties of this strain are now described in detail:

1. Morphological characteristics
   1. Aerial mycelium: aerial mycelium is formed abundantly in synthetic culture media such as glucose-asparagine-agar, starch-synthetic agar etc., and is generally short, monopodially branched. Ends of the aerial mycelium is spiral (closed).

TABLE 2

| Sources of Amylase | Optimum pH | Limit in hydrolysis of starch by action of amylase | Ratio of glucose to maltose produced (by weight) | Optimum temperature (°C) | Actibation by Calcium cation | Actibation by Chlofide anion |
|---|---|---|---|---|---|---|
| Streptomyces albus | 4.5–5.0 | 78 | 0.058:1 | 50–60 | Negative | Negative |
| Streptomyces aureofaciens | 4.5–5.0 | 76 | 0.058:1 | 50–60 | Negative | Negative |
| Streptomyces hygroscopicus | 4.5–5.0 | 82 | 0.055:1 | 50–60 | Negative | Negative |
| Streptomyces hygroscopicus var. angustomycetes | 4.5–5.0 | 80 | 0.053:1 | 50–60 | Negative | Negative |
| Streptomyces viridochromogenes | 4.5–5.0 | 79 | 0.051:1 | 50–60 | Negative | Negative |
| Streptomyces flavus | 4.5–5.0 | 76 | 0.058:1 | 50–60 | Negative | Negative |
| Streptomyces tosaensis nov. sp. | 4.5–5.0 | 79 | 0.053:1 | 50–60 | Negative | Negative |
| Bacillus substilis (Bacteria) | 5.3–6.8 | 70* | 0.71:1 | — | Negative | Positive |
| Aspergillus oryzae (Fungi) | 5.5–5.9 | 48* | 0.64:1 | — | Negative | Negative |
| Germinated barley (Plant) | 4.7–5.8 | 80 | — | — | Postive | Negative |
| Hog panereas | 6.9 | 80 | 0.024:1 | — | Negative | Positive |
| Human saliva | 6.9 | 80 | — | — | Negative | Positive |

*Calculated as glucose

By comparing the properties of the various amylases shown in Table 2, it is evident that the new amylases of the above-mentioned seven Streptomyces species produced by the present invention are not coincident with any of the known amylases particularly in view of their optimum pH range, the limit in the hydrolysis of starch, activation by calcium cation and chloride anion. Tht the new amylases of the above particular seven Streptomyces species produced by the present invention exhibit a relatively lower optimum pH and higher optimum temperature a relatively higher value for the limit in the hydrolysis of starch in combination with their lower ratio of glucose to maltose is very much advantageous in utilizing them for the commercial production of maltose from starch. This is because their relatively lower optimum pH and higher optimum temperature allows the process of hydrolysis of starch to take place in such pH and temperature environment that would prevent the contamination of the Saccharification mixture by growth of undesired microorganisms, because their relatively higher value for the limit of the hydrolysis of starch enables the hydrolysis of starch to proceed more completely and more efficiently, and because their lower value for the ratio of glucose to maltose produced from the hydrolysed starch leads to a more efficient and preferential formation of maltose, with 2. Spore: Spores are oval or elliptical shape to cylindrical shape, and the size of spore is measuring 0.6–0.7 microns by 0.8–1.0 microns. The surface structure of spore is smooth.

2. Properties on different culture media

Observations of the cultures of *Streptomyces tosaensis nov. sp.* are tabulated in Table 3 below.

TABLE 3

| Culture medium | Growth | Aerial mycelium | Soluble pigment |
|---|---|---|---|
| Sucrose Czapek's agar (incubated at 28°C) | Very much poor growth, colorless | Very much scant, white colored | None |
| Glycerine Czapek's agar (incubated at 28°C) | Very much poor growth, colorless | Very much scant, white colored | None |
| Krainsky's glucose asparaagine agar (incubated at 28°C) | Brown to reddish brown colored, the growth penetrates in the agar | Abundant, green to greyish green colored, with white colored patches | None |
| Ushinsky's glucose asparagine agar (incubated at 28°C) | Good growth, reddish brown colored | Green to greyish green colored, with white to pink colored | Faint reddish brown colored |

TABLE 3-Continued

| Culture medium | Growth | Aerial mycelium | Soluble pigment |
|---|---|---|---|
| Calcium-malate agar (incubated at 28°C) | Poor growth, colorless | Scant, greyish green colored patches | None |
| Glycerine calcium-malate agar (incubated at 28°C) | Poor growth, cream colored | Scant, white colored | None |
| Starch synthetic agar (incubated at 28°C) | Good growth, brown to reddish brown colored | Abundant, green to greyish colored, with formation of white and rose colored patches | None |
| Ordinary agar (incubated at 28°C) | Yellowish brown colored | None | None |
| Nutrient agar (incubated at 28°C) | Good growth, pale brown colored, with formation of wrinkles | Scant, white colored | None |
| Peptone glucose agar (incubated at 28°C) | Pale yellowish brown colored | None | None |
| Tyrosine agar (incubated at 28°C) | Reddish brown colored | Grey colored | Reddish brown colored |
| Potato plug (incubated at 28°C) | Elevated, good growth, pale greyish cream colored but reddish brown colored at the upper part of the slope | None | None |
| Carrot plug (incubated) at 28°C) | Pale greyish cream colored | Green to greyish green colored | None |
| Skimmed milk (incubated at 37°C) | Ring shaped growth, pale yellowish brown colored | None | None |
| Egg (incubated at 37°C) | Poor growth, pale yellow colored | None | None |
| Loeffler coagulated serum medium (incubated at 28°C) | Poor growth, pale greyish yellow colored | None | None |
| Glucose Czapek's solution (incubated at 28°C) | Ring shaped growth, cream colored | None | None |
| Gelatine medium (incubated at 20°C) | Pale cream colored | None | None |
| Cellulose medium (incubated at 28°C) | No growth | — | — |

3. Physiological properties.
   Formation of melanine: negative
   Production of hydrogen sulfide: negative
   Production of tyrosinase: negative
   Reduction of nitrate: positive
   Hydrolysis of starch: positive
   Peptonization of skimmed milk: positive
   Coagulation of skimmed milk: negative
   Dissolution of Loeffler's coagulated serum: negative
   Liquefaction of gelatine: positive
   Hydrolysis of cellulose: negative
4. Utilization of carbon sources.
   1. Utilization: xylose, glucose, galactose, maltose, lactose, raffinose, dextrin, starch, glycerine, mannitol, sodium acetate, sodium citrate, sodium succinate, salicin and mannose.
   2. Doubtful utilization: arabinose and saccharose.
   3. Not utilize: rhamnose, fructose, inulin, dulcitol, sorbitol, inositol and cellulose.

The above-mentioned microbiological characteristics of this new microorganism, Streptomyces tosaensis nov. sp. may be summarized as follows: the aerial mycelium produces a number of spirals and the surface structure of the spore is smooth. On synthetic culture media, green to greyish green colored aerial mycelium is formed on brown to reddish brown colored growth without formation of soluble pigment. On the other hand, on organic culture media, yellowish brown to reddish brown colored growth is observed but poor except that green colored growth is observed on carrot plug. Soluble pigment is generally not produced exdept that reddish brown colored soluble pigment is produced on tyrosine agar medium. Thus, this strain is non-chromogenic.

This strain is essentially characterised by that it is non-chromogenic and produces green colored aerial mycelium. When known species of microorganisms having similar microbiological characteristics are detected from the disclosure in Wakman's "The Actinomycetes" Vol. 2 (1961), it may be mentioned that Streptomyces prasinus, Streptomyces hirsutus, Streptomyces prasinopilosus, Streptomyces viridans, Streptomyces alboviridis Streptomyces viridus, and Streptomyces glaucus are species close to the new microorganism Streptomyces tosaensis nov. sp. However, this new microorganism can be differentiated from these known species as described below.

1. The surface structure of spore of Streptomyces prasinus and Streptomyces hirsutus is spiny, whereas that of Streptomyces tosanenesis nov. sp. is smooth.

2. The surface structure of spore of Streptomyces prasinopilosus is hairy while that of Streptomyces tosaensis nov. sp. is smooth.

3. Streptomyces viridans shows green to olive green colored growth on glycerine Czapek's agar and produces green to olive green colored soluble pigment on both of glycerine Czapek's agar and potato plug, whereas Streptomyces tosaensis nov. sp. shows a brown to reddish brown colored growth on agar medium but produces no soluble pigment on potato plug.

4. Streptomyces alboviridis produces yellow colored soluble pigment on glucose asparagine agar and greenish brown colored soluble pigment on gelatine medium, darkens potato plug and coagulates skimmed milk. While, Streptomyces tosaensis nov. sp. produces soluble pigment neither on glucose asparagine agar nor on gelatin medium, does not darken potato plug and does not coagulate skimmed milk.

5. Streptomyces viridis does not form spiral but shows green colored growth on various agar media, and its aerial mycelium is normally grey in color. While, Streptomyces tosaensis nov. sp. produces many spirals and shows brown to reddish colored growth on various agar media, and its mycelium is green to greyish green in color.

6. Streptomyces glaucus produces brown colored soluble pigment on sucrose Czapek's agar, forms green colored aerial mycelium on nutrient agar and potato plug and shows good growth on cellulose medium. While, Streptomyces tosaensis nov. sp. produces no soluble pigment on sucrose Czapek's agar, forms little aerial mycelium on nutrient agar and potato plug and shows no growth on cellulose medium.

Among the known strains which belong to the genus Streptomyces, such microorganisms which are non-chromogenic but form green colored aerial mycelium similarly to the microorganisms *Streptomyces tosaensis nov. sp.* are relatively a few. In the above-mentioned comparison between the known strains and the microorganism *Streptomyces tosaensis nov. sp.*, no strain which is coincident with the microorganism *Streptomyces tosaensis nov. sp.* can be found among the known species of the genus Streptomyces. In consequence, it is reasonable to believe that *Streptomyces tosaensis nov. sp.* should be a new species. So we designated this new microorganism as *Streptomyces tosaensis*. This strain was isolated by us from a soil sample which was collected in Kouchi perfecture, Japan.

In carrying out the first aspect process of the present invention, a strain of *Streptomyces albus*, *Streptomyces aureofaciens*, *Streptomyces hygroscopicus*, *Streptomyces hygroscopicus var. angustomyceticus*, *Streptomyces viridochromogenes*, *Streptomyces flavus* and *Streptomyces tosaensis nov. sp.* may be cultivated in any of the known culture media which is usually employed for the cultivation of Streptomyces, resulting in that the new amylase of the aforesaid enzymatic characteristics is produced and accumulated in the culture medium.

Thus, the production medium used for the cultivation of a strain of the Streptomyces according to the first aspect of the present invention may contain one or more of starch, soluble starch, glucose and corn meal etc., as the carbon sources and one or more of defatted soybean meal, defatted cotton seed meal, wheat embryo, peanut meal, ferma media, fish meal, dried yeast, skimmed milk, casein, malt extract, yeast extract, sodium nitrate and potassium nitrate etc., as the nitrogen sources. In addition, it is possible to use and incorporate in the culture medium one or more of inorganic salts such as potassium dihydrogen phosphate, magnesium sulfate, manganese sulfate, ferric sulfate and calcium carbonate etc., as well as trace elements in order to promote the growth of the microorganism and to enhance the production of the enzyme, if required.

In the process of the present invention the cultivation of a strain of the Streptomyces may be carried out in a known manner and under the conventional culturing conditions which are usually employed for the cultivation of Streptomyces. Thus, it is possible to perform either liquid cultivation or solid cultivation to produce and accumulate the new amylase in a liquid or solid culture medium. However, liquid cultivation and particularly liquid cultivation under submerged aerobic conditions is most preferred. When one of the above-mentioned strains of the Streptomyces incubated is incubated at a temperature of 25°–37°C and at a pH in the range of a week acidity to a weak alkalinity under submerged aerobic conditions with aeration and agitation, the product of the new amylase reaches a maximum in 3 to 5 days of incubation.

For the recovery of the amylase, the culture medium or culture broth in which the incubation of the Streptomyces has been carried out may be treated in a known manner to separate the new amylase therefrom. Thus, the culture broth may be filtered to remove the mycelium cake, and the resulting filtrate may then be treated either through a salting-out technique by adding a water-soluble inorganic salt such as ammonium sulfate etc., or through a precipitation method by adding a water-miscible organic solvent such as ethanol, methanol, isopropanol, acetone etc., or through an adsorption-elution method with an ion-exchange resin etc. In this way, the new amylase may be separated from the incubated culture medium. The new amylase thus separated may further be 126 by spray-drying, hot-air drying, vaccum-drying, freeze-drying or lyophilizing to give a crude powder preparation of the new amylase.

The crude amylase may be purified in a manner which is known for the purification of enzymes. An electrophoretically homogeneous and pure product of the new amylase of the present invention may be obtained by purifying the above-mentioned crude powder preparation of the new amylase through the following purification method. The culture broth in which the liquid cultivation of Streptomyces had been completed was filtered to give a culture filtrate (15.1) to which ethanol was then added to an ethanol concentration of 60% (v/v) to give precipitate. This precipitate is drained and dried to give a powder (100 g.) which was agitated together with 2 l. of tap water added for extraction. The mixture was filtered to give a filtrate and an extraction residue which was discarded. The filtrate was added with calcium acetate (44 g.), and the mixture was filtered to give a filtrate and a precipitate which was discarded. The filtrate was made to 30% saturation with ammonium sulfate, and this mixture was filtered to separate a further filtrate from the precipitate. This filtrate removed was again made to 70% saturation using ammonium sulfate to give a precipitate. This precipitate was taken into 260 ml. of tap water and dialysed against a flowing stream of tap water. The dialysed solution was concentrated by evaporation under reduced pressure and then lyophilized. The lyophilized powder product (1.21 g.) was then subjected to column chromatography with DEAE-Sephadex A-50 (column capacity: 4.8 cm. × 54 cm.) (DEAE-Sephadex A-50 is a commercially available gel-filtration agent produced by Pharmacia Co., of Sweden and comprising dextran gel which is cross-linked by epichlorohidrin). This chromatography was carried out by placing an aqueous solution of 700 mg. of said lyophilized powder on the column which was buffered by the addition of a buffer solution consisting of M/200 Tris-hydroxymethylaminomethane and hydrochloric acid together with M/1000 calcium (pH 8.5), and eluting the column first with the same buffer solution, then with the same buffer solution but containing 0.05M sodium chloride and finally with the same buffer solution but containing 0.1M sodium chloride. Active fractions containing high concentrations of the new amylase were collected from the elute and combined together (440 ml.). The combined fractions were concentrated by evaporation under reduced pressure, and the resulting concentrate was dialysed against distilled water and lyophilized to give a lyophilization product (61 mg.). This lyophilized product was again subjected to column chromatography with DEAE-Sephadex A-50 (column capacity: 1.15 cm. × 33 cm.) by placing an aqueous solution of 45 mg. of said lyophilized product on the column and eluting the column first with a buffer solution consisting of M/200 Tris-hydroxymethylaminomethane and hydrochloric acid (pH 8.5), then with an aqueous solution of 0.05M sodium chloride and finally with an aqueous solution of 0.1M sodium chloride. Active fractions containing high concentration of the new amylase were collected from the eluate. The combined fractions (40 ml.) was concentrated by evaporation under reduced pressure, and the resulting concentrate was dialysed against distilled water and lyophilized to give a lyophilized product (24 mg.) which was an electrophoretically homogeneous and pure product of the new amylase.

That this lyophilized product of the new amylase is a single and pure substance was confirmed by performing an electrophoresis with cellulose acetate gel in the under-mentioned manner: the electrophoresis was effected using cellulose acetate gel saturated with a fuffer solution consisting of Tris-hydroxymethylaminomethane and hydrochloric acid (pH 8.7; 0.05μ), passing an electric current of 0.6 mA/cm. for 65 minutes and staining the enzymatic protein with amino Schwartz solution. It was then found that the sample migrated 2.2 cm. towards the positive pole, giving a single band.

Properties of a new amylase which has been obtained from the culture of Streptomyces hygroscopicus and purified by the above specified purification method are stated below in detail.

1. Enzymatic action

When a pure product of this new amylase of Streptomyces hygroscopicus is reacted with starch and amylose, respectively, these carbohydrates are efficiently hydrolysed, producing a small amount of glucose but a considerably larger amount of maltose as shown below.

TABLE 4

| Substrate | Degree of hydrolysis* | Relative amount of sugar products** | | |
|---|---|---|---|---|
| | | Glucose | Maltose | Malto-oligosugars |
| Starch | 74.8% | 3.2% | 58.2% | 38.6% |
| Amylose | 78.6% | 0 | 62.8% | 34.9% |

Referring to Table 4:
*"Degree of hydrolysis" was determined by reacting the amylase with the substrate at pH 5.5–5.8 at 50°C for 20 hours at a substrate concentration of 1% (the amylase being dosed at 500 saccharifying units per 1 g. of the substrate), measuring the total amount of the produced reducing sugars by the Somogyi's titration method, calculating the determined total amount of the reducing sugars as maltose and then evaluating the "degree of hydrolysis" by the following equation:
"Degree of hydrolysis"
= (Total amount of the produced reducing sugars calculated as maltose)/(Amount of starch calculated as maltose) × 100
where "Amount of starch calculated as maltose" is determined by hydrolysing completely the substrate by heating together with a sufficient quantity of 2N hydrochloric acid on a boiling water bath, neutralising the reaction mixture with sodium hydroxide, measuring the amount of the produced glucose according to the Somogyi's titration method and then calculating the measured amount of the glucose as maltose, that is to say, evaluating a product of the measured amount of the glucose by 0.95 as "Amount of starch calculated as maltose."
**"Relative amounts of sugar products" was measured by fractionating the hydrolysed products of the substrate by chromatography, determining separately the quantity of each of the isolated sugar components and expressing the proportions of them in terms of percent by weight.

2. Substrate specificity

When a purified preparation of the new amylase of Streptomyces hygroscopicus is reacted with various substrated as indicated below, there are obtained the results as shown in Table 5:

TABLE 5

| Substrates | Degrees of saccharification* | Sugars produced** | | | | |
|---|---|---|---|---|---|---|
| | | $G_1$ | $G_2$ | $G_3$ | $G_4$ | $G_5$ |
| Soluble starch | 100% | ± | +++ | ++ | + | + |
| Maize starch | 92.8% | ± | +++ | ++ | ± | + |
| Glycogen | 45.8% | − | +++ | ++ | ± | ± |
| Amylose | 106.5% | − | +++ | ++ | − | + |
| Dextrin | 91.0% | ± | +++ | ++ | ± | + |
| β-Cyclodextrin | | − | − | − | − | ± |
| α-Cyclodextrin | | − | + | − | − | ± |
| Maltohexaose | | − | ++ | + | + | − |
| Maltopentasose | | − | ++ | ++ | − | |
| Maltotetraose | | ± | ++ | ± | | |
| Maltotriose | | − | − | | | |
| Maltose | | − | | | | |
| Phenyl α-D-glucoside | | − | | | | |

Referring to Table 5:
*"Degrees of saccharification" were determined by such a scale that the "degree of hydrolysis" of soluble starch by the action of a given amount of the purified new amylase is assumed as 100%.
**"Sugars produced" were anlayzed by detecting the presence of the respective sugars by a paper chromatography after reacting the enzyme with the substrate at a pH value of 5.5 at a substrate concentration of 0.8% and at an enzyme concentration of 0.00017% at 40°C for 60 minutes.

In Table 5, the letters $G_1$, $G_2$, $G_3$, $G_4$ and $G_5$ mean glucose, maltose, maltotriose, maltotetraose and maltopentaose, respectively. The scales have the following significances:

+++ : A very much large amount of the sugar is present.
++ : A large amount of the sugar is present.
+ : A significant amunt of the sugar is present.
± : A trace of the sugar is present and
− : No presence of the sugar is detactable.

The new amylase of the present invention was reacted in a similar way with the other substrate glucan such as laminaran (araban β-1,3:β-1,6 = 7:3, pachyman (β-1,3) and dextran (available as Sephadex G-100, α-1,6), and it was then found that these glucan could not be hydrolyzed by the action of the new amylase of the present invention.

3. Optimum pH, stable pH and other properties

The new, pure amylase of Streptomyces hygroscopicus exhibits optimum pH, pH stability, optimum temperature and thermal stability, molecular weight and other enzyme-chemical and physical and chemical properties as summarised in Table 6 below and as shown graphically in FIGS. 1 to 5 of the attached drawings:

TABLE 6

| Properties | Value |
|---|---|
| Optimum pH for activity | 4.5–5.0 |
| Optimum temperature for activity | 50–60°C |
| pH stability | Residual enzymatic activity is no less than 90% of the initial activity after the enzyme is treated at 40°C for 60 minutes at pH of 4.5–9.8. |
| Thermal stability | Residual enzymatic activity is no less than 50% after the enzyme is treated at pH of 6.8 at 30°C–95°C for 15 minutes. |

TABLE 6—Continued

| Properties | Value |
| --- | --- |
| Specific activity | Liquefying potency: 23100 μ/mg. N<br><br>Saccharifying potency: 59600 μ/mg. N |
| Elementary analysis | C 44.87%, H 6.84%, N 13.84% |
| Molecular weight | ca. 35,000 (as determined by the gel-filtration method) |
| Ultraviolet absorption | $E_{1\ cm}^{1\%} = 13.1$, at 280 mμ (pH = 6.8) |
| Isoelectric point | About pH 4.3 (measured by the isoelectric point electrophoresis) |
| Electrophoresis (in cellulose acetate gel) | Migration of 2.2 cm towards the positive pole for 65 minutes by an electric current of 0.8 mA/cm., buffered at pH 8.7 by Tris hydrochloric acid buffer solution (μ = 0.05). |

Referring to the attached drawings:

FIG. 1 shows the enzymatic activity at various pH of the new amylase which is obtained from *Streptomyces hygroscopicus* according to the present invention.

The determination conditions: the enzymatic activity was measured in term of the saccharifying activity under such condition that the reaction mixture was adjusted to pH 2–3 by means of 0.1M sodium acetate-hydrochloric acid buffer solution, to pH 3.5–6.0 by means of 0.1M acetate buffer solution and to pH 6.5–8.0 by means of 0.1M phosphoric acid-sodium phosphate buffer solution.

Figure 2:
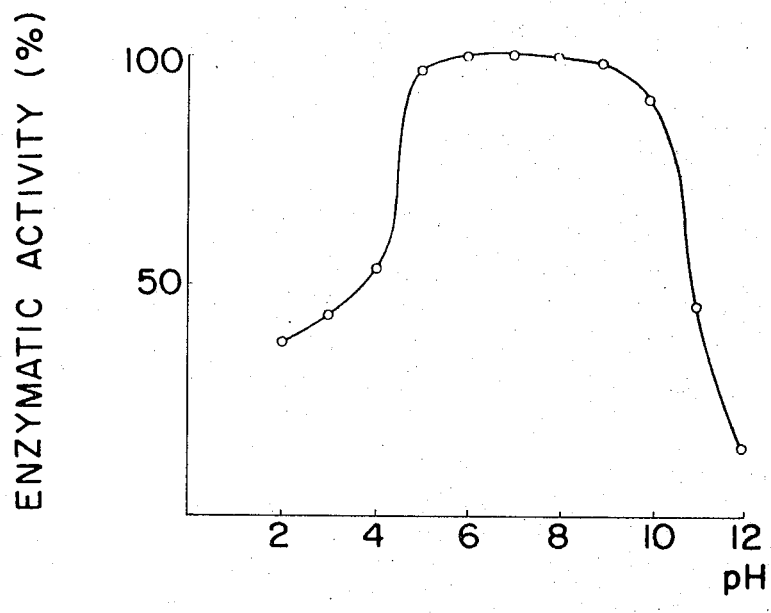

FIG. 2 shows a curve of the pH-stability of the enzymatic activity of the new amylase which is obtained from *Streptomyces hygroscopicus* according to the present invention.

The treatment conditions: The enzymatic activity was measured in term of the saccharifying activity which was determined after the enzyme was held at various pH values at 40° C for 60 minutes and the reaction mixture was subsequently adjusted to pH 5.5.

Figure 3:
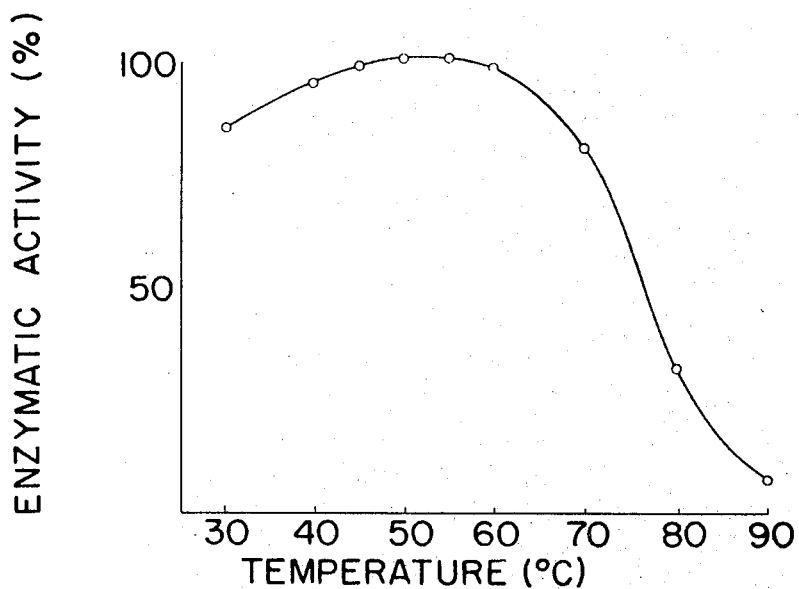

FIG. 3 shows a curve of the temperature-dependency of the enzymatic activity of the new amylase which is obtained from *Streptomyces hygroscopicus* according to the present invention.

The determination conditions: The enzymatic activity was measured by determining the saccharifying activity of the enzyme by a conventional method which is known for the amylase, while the enzyme was held at various temperatures.

Figure 4:
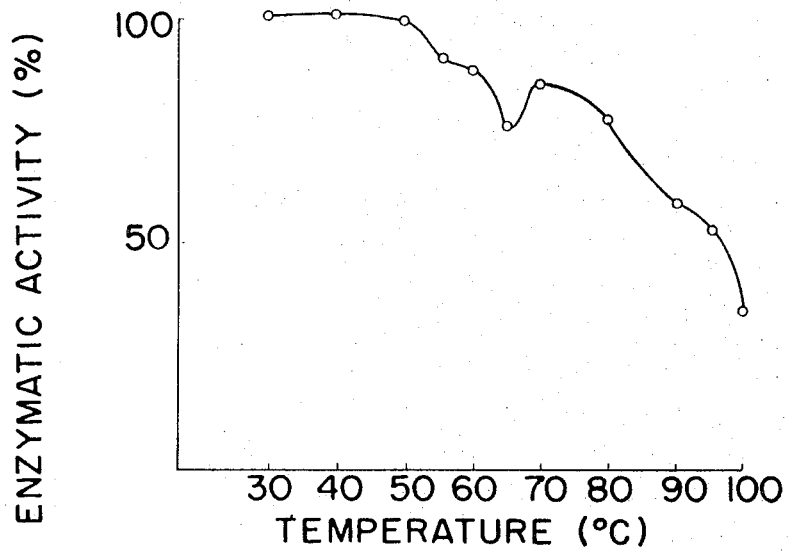

FIG. 4 shows a curve of the temperature stability of the enzymatic activity of the new amylase which is obtained from *Streptomyces hygroscopicus* according to the present invention.

The treatment conditions: The enzymatic activity was then measured in term of the saccharifying activity which was determined immediately after the enzyme was held at various temperatures at pH 6.8 for 15 minutes, followed by cooling to room temperature.

Figure 5:
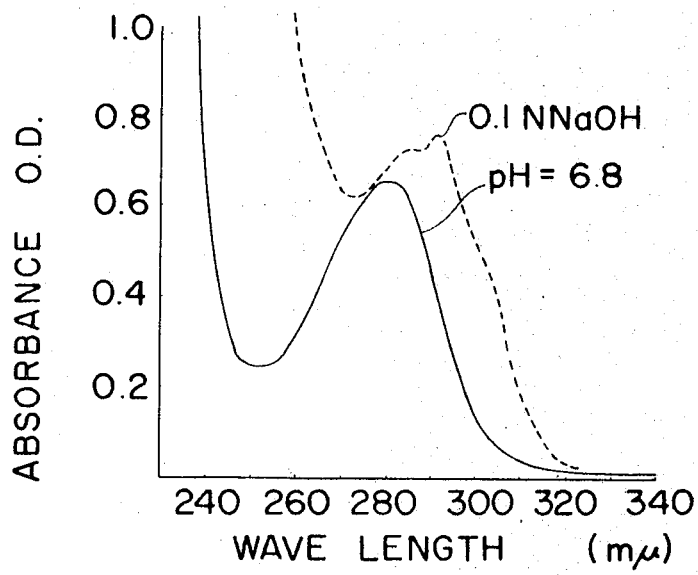

FIG. 5 shows a curve of the ultra-violet absorption spectrum of the new amylase which is obtained from *Streptomyces hygroscopicus* according to the present invention.

4. Conditions of pH, temperature and other factors for inactivation a. When the new amylase which is obtained from Streptomyces hygroscopicus according to the present invention is treated at pH value of no less than 11 at 50° C for 60 minutes, it can be inactivated.

b. When this new amylase is treated at a pH value of 10 at 90° C for 30 minutes, it can be inactivated.

5. Inhibitors

The following table summarises the effects of some inhibitors, inorganic salts and other chemicals on the enzymatic activity of the new amylase which is obtained from *Streptomyces hygroscopicus* according to the present invention.

TABLE 7

EFFECTS OF INHIBITORS, INORGANIC SALTS AND OTHER CHEMICALS ON THE ENZYMATIC ACTIVITY OF THE NEW AMYLASE OBTAINED FROM *STREPTOMYCES HYGROSCOPICUS* ACCORDING TO THIS INVENTION

| Reagent | Residual liquefying activity of enzyme | | Residual saccharifying activity of enzyme | |
| --- | --- | --- | --- | --- |
| | Concentration of reagent | % of initial activity | Concentration of reagent | % of initial activity |
| INORGANIC METAL SALTS | | | | |
| Barium chloride | $10^{-2}M$ | 97.6 | $10^{-2}M$ | 109.8 |
| Calcium chloride | do. | 97.6 | do. | 103.9 |
| Cobalt chloride | do. | 95.5 | do. | 99.7 |
| Chromic chloride | do. | 95.5 | do. | 94.8 |
| Ferrous sulfate | do. | 102.3 | do. | 100 |
| Mercurous chloride | do. | less than 6 | do. | 0 |
| Mercuric chloride | do. | 91.3 | do. | 87.1 |
| Potassium bromide | do. | 100 | do. | 100 |
| Lithium chloride | do. | 102.3 | do. | 96.9 |
| Magnesium sulfate | do. | 100 | do. | 95.1 |
| Manganese chloride | do. | 93.4 | do. | 88.6 |
| Sodium chloride | do. | 93.4 | do. | 95.1 |
| Nickel chloride | do. | 91.3 | do. | 94.3 |
| Stannoous chloride | do. | x | do. | 8.2 |
| Strontium chloride | do. | 95.5 | do. | 105.2 |
| Zinc sulfate | do. | 85.8 | do. | 89.9 |
| Ammonium molybdate | do. | 105.9 | do. | 93.4 |
| ORGANIC REAGENTS | | | | |
| Sodium oxalate | $10^{-2}M$ | 97.6 | $10^{-2}M$ | 96.9 |

TABLE 7 — Continued

EFFECTS OF INHIBITORS, INORGANIC SALTS AND OTHER CHEMICALS ON THE ENZYMATIC ACTIVITY OF THE NEW AMYLASE OBTAINED FROM *STREPTOMYCES HYGROSCOPICUS* ACCORDING TO THIS INVENTION

| Reagent | Residual liquefying activity of enzyme | | Residual saccharifying activity of enzyme | |
|---|---|---|---|---|
| | Concentration of reagent | % of initial activity | Concentration of reagent | % of initial activity |
| Mono-iodoacetic acid | do. | 96.5 | do. | 97.0 |
| L-Ascorbic acid | do. | x | do. | 107.4 |
| Cystin hydrochloride | $10^{-1}M$ | 98.6 | $10^{-1}M$ | 96.6 |
| Urea | $10^{-2}M$ | 101.0 | $10^{-2}M$ | 95.8 |
| Ethanol | 20% | 65.7 | 20% | 51.8 |
| Ethanol | 10% | 98.9 | 10% | 86.3 |
| Aniline | $10^{-2}M$ | 98.6 | $10^{-2}M$ | 95.1 |
| Glutathiene (reduced type) | $10^{-4}M$ | 101.0 | $10^{-4}M$ | 95.1 |
| Amylase Inhibitor | 0.001% | 85.8 | 0.001% | 91.4 |
| Ethylenediamine tetra-acetic acid | 0.1M Treated at pH 6.7 at 30°C for 60 minutes | 94.9 | 0.1M Treated at pH 6.7 at 30°C for 60 minutes | 108.5 |
| o-Phenanthroline | $10^{-3}M$ Treated similarly to the above | 94.9 | $10^{-3}M$ Treated similarly to the above | 112.0 |
| Mercury p-chlorobenzoate (PCMB) | $2.5\times10^{-4}M$ Treated similarly to the above | 100.0 | $2.5\times10^{-4}M$ | 93.0 |
| ANTIBIOTICS | | | | |
| Nojirimycin | $10^{-2}M$ | 86.1 | $10^{-2}M$ | x |
| Kanamycin sulfate | $10^{-4}M$ | 101.0 | $10^{-4}M$ | 96.5 |
| Penicillin G potassium salt | do. | 101.0 | do. | 96.5 |
| Chloramphenicol | do. | 101.0 | do. | 92.5 |
| Chlorotetracycline hydrochloride | do. | 101.0 | do. | 95.6 |

6. Determination of enzymatic activity

Enzymatic activity of the new amylase which is obtained from *Streptomyces hygroscopicus* have been mentioned in Tables 4, 5 and 6 in the above, and the method for the determination of the enzymatic activity and the method for the representation of the potencies of the new amylase are now described below.

A. Determination of the activity of saccharifying starch 2 ml. of an aqueous solution of 2% soluble starch, 2 ml. of McIlvaine's buffer solution, pH 5.5 and 1 ml. of an aqueous solution of the enzyme are mixed together, and the resulting mixture is heated at 40° C for 3 minutes to effect the hydrolytic reaction of the starch. After this, 1 ml. of the reaction mixture is taken and added into the cuprous reagent of the Somogyi's titration method to cease the reaction. The quantity of reducing sugars formed in 1 ml. of the reaction mixture is determined according to the Somogyi's titration method. The amount of reducing sugars formed and present per 5 ml. of the reaction mixture is calculated in this way and expressed in term of the maltose equivalent, assuming that all the reducing sugar present are essentially composed of maltose.

B. Representation of the activity of saccharifying starch

Potency of the new amylase is represented in term of the activity of saccharifying starch as determined in the above specified manner, and providing that such an amount of the enzyme which releases 1 mg. of the maltose per 5 ml. of the reaction mixture when reacted for 60 minutes in the above specified manner is equivalent to one unit of the new amylase.

C. Determination of the activity of liquefying starch 5 ml. of an aqueous solution of 2% soluble starch (also comprising 10 ml. of 1M acetate buffer solution, pH 5.5 per 100 ml. thereof), 0.5 ml. of 1M acetate buffer solution, pH 5.5, 1.5 ml. of distilled water and 0.5 ml. of an aqueous solution of the enzyme are mixed together, and the resulting mixture is warmed at 30° C to effect the hydrolytic reaction of the starch. After a predetermined reaction time, 0.2 ml. of the reaction mixture is taken out and added into 2 ml. of an iodine solution (which has been prepared by dissolving 88 mg. of elementary iodine and 44 g. of potassium iodide per 1 litre of distilled water). The color of the iodine solution so treated is compared to a standardized color of a solution (which has been prepared by mixing 1 volume of a solution of 25 g. of $FeCl_3.6H_2O$ in 50 ml. of 2% hydrochloric acid with 9 volumes of a solution of 25 g. of $CoCl_2.6H_2O$ in 50 ml. of 2% hydrochloric acid). Estimation is then made of such a reaction time (in minute) of said reaction mixture which is required to make the color of the above-mentioned treated iodine solution identical to the aforesaid standardized color. The solution of the enzyme tested has been diluted serially be a factor $n$ to such a dilution at which said reaction time of the reaction mixture required to give the color of the treated iodine solution identical to the standardized color is no less than 5 minutes.

D. Representation of the activity of liquefying starch

Activity of the new amylase may be expressed also in term of the activity of liquefying starch as determined in the above specified method and by means of Wohlgemuth's value ($W.V.$) which is calculated by the following equation:

$$W.V. = 1/T \times n \times 400$$

where $T$ is the above defined reaction time (in minutes) of the reaction mixture required to give the color of the above-mentioned treated iodine solution identical to the standardized color; and $n$ is the factor of dilution at which the solution of the enzyme tested has been diluted. Activity is then expressed, providing that 1 $W.V.$ is equivalent to one unit of the new amylase for the activity of liquefying starch.

We have made further investigation of the conditions for the cultivation or incubation of a strain of the Streptomyces for the purpose of improving commercial production of the new amylase, and we have found that the production of the new amylase may be improved when the known conditions for the cultivation of Streptomyces are modified as described below.

*a.* Thus, we have modified in various ways the composition of the culture medium which is used to cultivate *Streptomyces hygroscopicus* for the production of the new amylase according to the present invention. For the cultivation of *Streptomyces hygroscopicus*, we employed at first time a culture medium of such a composition: 1% defatted soybean meal, 3% soluble starch and 0.2% $KH_2PO_4$ where the ratio of carbon content to nitrogen content by weight was about 13.5. Then we employed culture media of different compositions as indicated below where the C/N ratio was adjusted to various values in the range of 1 to 100, and we examined the enzymatic activity of the culture filtrate as obtained from these culture media of the different compositions. As a result, it has been found that the culture filtrate shows a maximum value for the enzymatic activity when the C/N ratio of the culture medium employed is close to 20, and that the maximum value of the enzymatic activity is about two times the value of the enzymatic activity obtained when the culture medium having the C/N ratio of 13.5 was employed at the first time. The effect of the C/N ratio of the culture medium on the production of the new amylase by the cultivation of *Streptomyces hygroscopicus* may be seen from the test results which are tabulated in Table 8 below.

The above-mentioned test results of Table 8 were obtained by the following test procedure: Each of the culture media of the different compositions as indicated above was added with 0.2% of $KH_2PO_4$, and 30 ml. portions of these culture media were placed in 100 ml. conical flasks and then adjusted to pH 7.0–7.2. The contents of the flasks were then heated at 121°C for 15 minutes to prepare sterile culture media. On the other hand, *Streptomyces hygroscopicus* is inoculated to an inoculum medium comprising 2% starch, 1% peptone, 0.5% meat extract, 0.05% potassium dihydrogen phosphate, pH 7.0 and then shake-cultured at 28°C for 24 hours to give a seed culture. This seed culture was then inoculated at a concentration of 3% to each of the above-mentioned sterile culture media prepared. These inoculated culture media were subsequently incubated at 28°C for 90 hours in a rotary shaker. After this incubation, the enzymatic activity of the culture filtrates was determined.

*b.* We have further investigated how the concentrations of the carbon sources and nitrogen sources in the culture medium having a C/N ratio of 20 affect on the production of the new amylase by the cultivation of *Streptomyces hygroscopicus*. It has been found that the culture filtrate shows a maximum enzymatic activity when the carbon content (C% by weight) of the production medium is in the range of 2–6 and the nitrogen content (N% by weight) of the production medium is in the range of 0.1–0.3. Effect of the concentration of the nitrogen sources in production medium having the C/N ratio of 20 on the production of the new amylase by the cultivation of *Streptomyces hygroscopicus* may be seen from the test results which are tabulated in Table 9 below.

TABLE 9

| Nitrogen sources | | Carbon sources | | Index of enzymatic activity (%) |
|---|---|---|---|---|
| N% | Proportion of defatted soybean meal added (%) | C% | Proportion of soluble starch added (%) | |
| 0.019 | 0.24 | 0.356 | 1.0 | 19 |
| 0.037 | 0.47 | 0.738 | 2.0 | 25 |
| 0.076 | 1.0 | 1.520 | 4.2 | 60 |
| 0.145 | 2.0 | 2.885 | 8.4 | 86 |
| 0.208 | 3.0 | 4.138 | 12.7 | 100 |
| 0.317 | 5.0 | 6.325 | 21.1 | 57 |
| 0.525 | 10.0 | 10.503 | 42.3 | 37 |

*c.* Effect of the concentration of the nitrogen sources in culture media having the C/N ratio of 20 on the production of the new amylase by the cultivation of *Strep-*

TABLE 8

| C/H Ratio of culture medium | Proportion of defatted soybean meal in culture medium | Proportion of soluble starch in culture medium | Carbon content (%) of culture medium | Nitrogen content (%) of culture medium | Index of enzymatic activity of culture filtrate |
|---|---|---|---|---|---|
| 1 | 1 (%) | 0.01 (%) | 0.079 | 0.079 | 4.2 (%) |
| 5 | 1 | 1.1 | 0.47 | 0.079 | 30.4 |
| 10 | 1 | 2.0 | 0.77 | 0.078 | 52.8 |
| 20 | 1 | 4.2 | 4.14 | 0.208 | 100.0 |
| 30 | 1 | 6.4 | 2.23 | 0.075 | 49.2 |
| 40 | 0.23 | 2.0 | 0.72 | 0.018 | 12.7 |
| 60 | 1 | 13.1 | 4.20 | 0.070 | 3.3 |
| 100 | 1 | 21.9 | 6.49 | 0.065 | 0 | tomyces hygroscopicus may also been seen from the test results which are summarised in Table 10 below.

TABLE 10

| Carbon sources | | Nitrogen sources | | Index of enzymatic activity (%) of culture filtrate |
|---|---|---|---|---|
| C% | Proportion of soluble starch added (%) | N% | Proportion of defatted soybean meal added (%) | |
| 0.356 | 1 | 0.019 | 0.24 | 19 |
| 0.738 | 2 | 0.037 | 0.47 | 25 |
| 1.520 | 4.2 | 0.076 | 1.0 | 60 |
| 4.138 | 8.4 | 0.208 | 2.0 | 100 |
| 6.325 | 12.7 | 0.317 | 3.0 | 57 |
| 10.503 | 42.3 | 0.525 | 10.0 | 37 |

The test results of Table 9 and Table 10 were obtained by carrying out the tests in the same manner as in the test procedure by which the test results of Table 8 were obtained, the proportions of carbon sources and nitrogen sources added being indicated in Table 9 and Table 10.

In consequence, we have found that the optimum composition of production medium for the cultivation of Streptomyces hygroscopicus to produce and accumulate the new amylase has a C/N ratio in the vicinity of 20 and contains the carbon sources at such a concentration of 2–6% calculated as C% and also contains the nitrogen sources at such a concentration of 0.1–0.3% calculated as N %.

d. We have further investigated the effect of the addition of amino acids to the production medium for the cultivation of Streptomyces hygroscopicus, and it has been found that the addition of tryptophane and methionine is effective to improve the yield of the new amylase.

Effect of the addition of tryptophane on the production of the amylase by the cultivation of Streptomyces hygroscopicus is shown in Table 11 below.

TABLE 11

| Amount of tryptophane added (% of production medium) | Index of enzymatic activity of culture filtrate (%) |
|---|---|
| 0 | 100 |
| 0.005 | 110 |
| 0.01 | 120 |
| 0.05 | 130 |
| 0.1 | 146 | e. Effect of the addition of methionine on the production of the amylase by the cultivation of Streptomyces hygroscopicus is shown in Table 12 below.

TABLE 12

| Amount of methionine added (% of production medium) | Index of enzymatic activity of culture filtrate (%) |
|---|---|
| 0 | 100 |
| 0.02 | 190 |
| 0.05 | 185 |
| 0.1 | 195 |

The test results shown in Tables 11 and 12 were obtained by inoculating such a seed culture of Streptomyces hygroscopicus as described in the test procedure for Table 8 to a basal production medium comprising 1% defatted soybean meal, 3% soluble starch, 0.2% potassium dihydrogen phosphate, pH 7.0 to which the different amounts of the amino acid had been added, effecting the incubation at 28° C for 90 hours and then measuring the enzymatic activity of the culture filtrate.

f. Furthermore, a series of test of incubating Streptomyces hygroscopicus were carried out to evaluate the effect of the incubation temperature on the production of the amylase. When the tests was effected at different temperatures in the range of 28° to 40° C, it has been found that no remarkable difference can be observed in the growth of the microorganism but that an incubation temperature in the vicinity of 35° C is optimum for the production of the enzyme. The effect of the incubation temperature on the production of the amylase from Streptomyces hygroscopicus is shown in Table 13 below.

TABLE 13

| Incubation temperature (°C) | Mycelial volume (ml)* | Index of enzymatic activity of culture filtrate (%) |
|---|---|---|
| 28 | 4.7 | 60 |
| 35 | 4.4 | 100 |
| 40 | 4.2 | |

Note:
*"Mycelial volume" shown in Table 13 was determined by placing 10 ml. of the culture broth in a centrifuge tube, centrifuging at 3000 r.p.m. for 10 minutes and reading the volume of the precipitated mycelial cake.

The test results of Table 13 were obtained by inoculating 3% of such seed culture of Streptomyces hygroscopicus as prepared in the test procedure for Table 8, powder test tubes each containing a production medium consisting of 4% corn starch, 2% skimmed milk powdwem 0.2% $KH_2PO_4$, 0.2% $MgSO_4 \cdot 7H_2O$ and 0.01% $MnSO_4$ adjusted to pH 7.0, and then effecting the incubation at the different temperatures for 90 hours in a temperature-gradient incubator, and measuring the enzymatic activity of the culture filtrates.

According to a preferred embodiment of the first aspect of the present invention, therefore, we provide a process for the production of an amylase by the cultivation of 30 Streptomyces, which comprises cultivating a of a Streptomyces hygroscopicus at a temperature of about 35° C under aerobic conditions in a culture medium which contains know carbon sources and nitrogen sources at a carbon concentration of 2–6 C% and at a nitrogen concentration of 0.1—0.3 N% and at the C/N ratio of about 20:1 by weight, to produce and accumulate in the production medium the amylase which has such enzymatic activities and characteristics that the optimum pH is in the range of 4.5–5.0, the limit of the hydrolysis of starch by this amylase is 82% of the theoretical maltose and the ratio of glucose to maltose produced from starch by the action of this amylase is 0.055:1 by weight, and then recovering said amylase from the production medium in a known manner.

Of the above-mentioned particular seven species of Streptomyces which are cultivated according to the first aspect process of the present invention, Streptomyces hygroscopicus is found to be able to produce and accumulate a highest yield of the amylase.

As stated above, the new amylases of the particular Streptomyces species which are produced by the first aspect process of the present invention are advantageous and useful owing to the combination of their enzymatic activities and characteristics that their optimum pH is in the relatively more acidic range of 4.5–5.0, and optimum temperature is in the relatively higher range of 50°–60° C the limit in the hydrolysis of starch by these enzymes is no less than 75% of the theorectical maltose and the ratio of glucose to maltose produced from starch by the action of these enzymes is no more than 0.06:1 by weight. These combined advantageous characteristics of the new amylases of the particular Streptomyces species which are produced by the present invention are very much useful to produce a diet and natural sweetenings mainly composed of maltose.

In 1819, De Sau Suure discovered that maltose is present in the hydrolysis products of starch, and in 1847 Dubruntant gave the name "maltose." Maltose is chemically a disaccharide in which two molecules of D-glucose are combined together in the α-form. Pure maltose is in the form of a white colored powder which is easily soluble in water (when pure maltose becomes contained a molecule of water, the hydrate crystallises), and maltose shows a degree of sweetness which is one-half-fold to one-third-fold of that of cane sugar. However, maltose shows very much tasteful sweetness and may be recognised as a sugar which is more favorable for the health of man in the prevention of weight gaining and in the prevention of tooth decay, as compared to cane sugar. Usually, maltose has been produced by hydrolysing starch by the action of malt and hence may sometimes be called malt sugar. However, when the malt reacts on starch, the yield of maltose is then relatively low, so that the use of the malt is not very advantageous for the commerical production of maltose. When starch is hydrolysed by means of the malt, there are normally obtained such hydrolyzate which has a relatively low maltose content of about 40% on the dry weight basis. By subjecting this hydrolyzate to an especial processing such as fractionation or molecular-sieving treatment, it can be concentrated more or less but only to a maltose content of about 50%.

Recently, maltose is in a great demand in the confectionary industry and food industry owing to its tasteful sweetness and its favorable nature as the sweetening material. In addition, maltose gets now increasing demand for use as the starting material for the production of maltitol. Maltitol may be produced by a catalytic hydrogenation of maltose, and maltitol is in an increasing demand, since maltitol itself is a sugar which does neither participate in the metabolism of man nor cause the weight gaining when taken and since maltitol finds other applications owing to its characteristic physical, chemical and biological properties. Accordingly, a commercially efficient production of maltose is now expected to exploit.

We have now succeeded in preparing a dietetic and natural sweetening mainly composed of maltose and comprising 70% or more of maltose on the dry weight basis, by using starch as the starting material and reacting therewith the amylase which is obtained from the cultivation of the abovementioned particular seven Streptomyces species according to the first aspect process of the present invention.

According to the second aspect of the present invention, therefore, we provide a process for the preparation of saccharification products of starch mainly composed of maltose which is useful as a dietetic and natural sweetening material, which comprises liquefying and saccharifying starch material (including an amylose) in aqueous dispersion by reacting therewith in a known manner an amylase which is produced by cultivating a strain of *Streptomyces albus*, *Streptomyces aureofaciens*, *Streptomyces hygroscopicus*, *Strptomyces hygroscopicus var. Angustomyceticus*, *Streptomyces viridochromogenes*, *Streptomyces flavus* and *Streptomyces tosaensis* and which has such enzymatic activities and characteristics that the pH of the optimum activity is in the range of 4.5–5.0, the limit in the hydrolysis of starch by this amylase is no less the 75% of the theoretical maltose and the ratio of glucose to maltose produced from starch by the action of this amylase is no more than 0.06:1 by weight, until there is formed an aqueous solution of the saccharification products of starch containing at least 70% of maltose on the dry weight basis.

In the process according to the second aspect of the present invention, the starting starch material which may be used to react with the amylase of the Streptomyces may be any of the starch and starchy materials derived from sweet potato, potato, corn starch, tapiocs starch, rice, wheat and barley etc., as well as amyloses. The amylase of the Streptomyces which is used in the second aspect process of the present invention may be such a crude or purified preparation of the amylase which has been produced by cultivating a strain of the above-mentioned seven Streptomyces species as stated for the first aspect process of the present invention, filtering the resultant culture broth to remove the mycelia, either adding a water-soluble inorganic salt such as ammonium sulfate thereto to salt-out a crude amylase or adding a water-miscible organic solvent such as ethanol, methanol, isopropanol or acetone etc., to the culture filtrate to precipitate a crude amylase or absorbing a crude amylase from the culture filtrate onto an adsorbent-type ion-exchange resin, and, if desired, then purifying the crude amylase in a known manner, for example, by chromatography and finally drying a purified product of the amylase to give a powdery amylase preparation.

It is preferable for the second aspect process of the present invention to employ the amylase of the streptomyces in the form of a purified powdery amylase preparation, but is also feasible to use directly the culture filtrate itself or an aqueous solution of a crude amylase or a purified but non-dried amylase product.

The process of the second aspect of the present invention is now described in detail. A starting starch employed is dispersed in water to a suitable concentration after it is washed well with water at first to remove the foreign matter therefrom. An amylase of the Streptomyces may then be immediately reacted with the washed starch in the aqueous dispersion, though it is preferable to effect the step of liquefying the starch by reacting a known liquefying amylase, for example, bacterial α-amylase therewith prior to the saccharifying treatment of starch with the Streptomyces amylase. For carrying out the step of liquefying the starch, starch may be reacted at pH 5–6 and at 70°–90° C by with a known amylase (for example, a bacterial liquefying amylase known and commercially available a trade name "Spitase SP-1"). It is preferred to use an aqueous dispersion of starch at a starch concentration of 30–40% by weight. After this liquefaction is completed, the liquefying amylase is inactivated by heating. Subsequently thee liquefied starch in the aqueous dispersion or solution is subjected to a saccharifying step with the Streptomyces amylase which is added thereto. The Streptomyces amylase may be used and added in the form of either the culture filtrate, a crude amylase precipitated from the culture filtrate, or a solution of a partially purified amylase obtained during the purification of the culture filtrate, or a precipitated amylase deposited during the purification of the culture filtrate, or a purified and dried powdery amylase product. It is suitable that the Streptomyces amylase is added to the liquefied starch in an amount of 100–1,000 saccharifying units, preferably at in an amount of 200–400 saccharifying units per 1 g. of starch and that the saccharifying step is carried out at pH 4–6 and at 50°–60° C. The saccharification reaction may proceed until there is formed an aqueous solution of the saccharification products of starch containing maltose at a maltose content of 70% or more by weight on the dry basis, when the saccharification reaction may be deemed as having reached the end point. Thereafter the enzyme is inactivated by heating the saccharified starch solution. The inactivated reaction mixture, namely, the saccarified starch solution containing at least 70% by weight of maltose may then be used as such as a sweetening material, if desired, but it may subsequently passed to a filtration process and/or a concentration process and further to a de-colorising process and/or a de-salting process, if required.

The process of decolorising the solution of the saccharified starch in which the amylase has been inactivated by heating may be effected in a routine way using active carbon. In the de-colorisation process and also in the de-salting process, however, it is generally possible to use anyone of the known ion-exchange resins which have usually been used for the purpose of decoloration and de-salting. The decolorised and desalted sugar solution so obtained may then be concentrated by evaporation and, if required, dried to give a powdery product mainly comprising maltose. This product may be used as a tasteful, natural sweetening in the convectionary industry, food industry, pharmaceutical industry and other applications. An example of the analysis of the composition of a sweetening material which has been prepared using the amylase of Streptomyces hygroscopicus according to the second aspect of the present invention is mentioned below:

| | | |
|---|---|---|
| Maltose | 75.4% | (by weight) |
| Glucose | 3.1% | |
| Oligo-sugars (including malt triose, maltotetraose etc.) | 10.1% | |
| Dextrin | 11.4% | |

We have further, investigated the conditions suitable for the saccharification reaction when the saccharifying step of starch is carried out using the amylase of Streptomyces hygroscopicus according to the second aspect process of the present invention.

1. Investigation of the reaction temperature for saccharification

Starch of sweet potato was liquefied at first under the following liquifying conditions:

| | |
|---|---|
| Concentration of starch (sweet potato starch) | 30% |
| Amount of a bacterial liquefying amylase (available as a product of a trade name "Spitase SP-1") added as percent of the starch | 0.2% |
| pH | 6.0 |
| Temperature | 84–87°C |

The liquefied starch was then saccharified at an initial pH of 6.0 for 48 hours at different temperatures of 55°, 65° and 79° C in the presence of 400 units of the amylase of Streptomyces hygroscopicus per 1 g. of starch. The test results obtained are shown in the following table.

TABLE 14

VARIATION OF EXTENT OF STARCH HYDROLYSIS (HEREINAFTER ABBREVIATED AS "MH") WITH TIME AT DIFFERENT REACTION TEMPERATURES

| Temperature | Time lapse | | | | |
|---|---|---|---|---|---|
| | 16 Hours | 22 Hours | 26 Hours | 40 Hours | 44 Hours |
| 55°C | 73 | 86 | 87 | 90 | 90 |
| 65°C | 80 | 85 | 87 | 88 | 85 |
| 70°C | 52 | 53 | 50 | 46 | 45 |

Remarks: the saccharification reaction was carried out at 40° C, too, though no determination of the extent of starch hydrolysis (MH) was then worked as undesired microorganisms grew violently.

From the above test results it appears that a reaction temperature of 55° C is appropriate for the saccharification process. Extent of starch hydrolysis (MH) is defined by the following equation:

MH = Total reducing power of the products calculated as maltose/Total sugar amount × 100 where "Total sugar amount" represents the total reducing power of the completely hydrolysed starch calculated as glucose, and the reducing power is determined by the Somogyi's titration method.

2. Investigation of the concentration of the enzyme in the saccharification reaction Starch of sweet potato was liquefied at first under the following conditions:

| | |
|---|---|
| Concentration of starch | 3% |
| Amount of a bacterial liquefying amylase (available as a product of a trade name "Spitase SP-1") added as percent of the starch | 0.1% |
| pH | 6.0 |
| Temperature | 84–87°C |

The liquefied starch was then saccharified at a temperature of 55° C at an initial pH of 6.0 for 48 hours by reacting the amylase of Streptomyces hygroscopicus in such different amounts of 50 units, 100 units, 200 units, 400 units and 800 units per g. of the starch. Samples were withdrawn with time intervals and MH was determined. The results obtained are shown in the following table.

TABLE 15

Value of MH with time intervals at different amounts of the amylase used in the saccharification reaction

| Amounts of saccharogenic amylase (units) | Time lapse | | | |
|---|---|---|---|---|
| | 17 Hours | 24 Hours | 40 Hours | 48 Hours |
| 50 μ. | 40 | 44 | 67 | 64 |
| 100 μ. | 57 | 63 | 77 | 69 |
| 200 μ. | 70 | 72 | 73 | 74 |
| 400 μ. | 81 | 81 | 82 | 82 |
| 800 μ. | 96 | 99 | 104 | 106 |

From the above results it may be seen that the increase in MH is maximum at an amylase concentration of 800 u./g. starch. From the view-point of economic, however, it is preferred to select a concentration of 400 u./g. starch for the practical concentration of the saccharogenic amylase of Streptomyces hycroscopicus.

3. Investigation of the starch concentration for the saccharification reaction

Tests were carried out using starch of sweet potato as the starting material and charging the starch at different concentrations of 30%, 34%, 40% and 45% by weight of the aqueous dispersion in which the starch was dispersed.

The starch was liquefied at first at pH 6.0 and at a temperature of 84° – 87°C using a bacterial liquefying amylase (Spitase SP-I) in an amount of 0.1% by weight of the starch (10 u./g. starch).

The liquefied starch was then saccharified at 55° C and at an initial pH of 6.0 for 48 hours using the amylase of Streptomyces hygroscopicus in such an amount of 400 u. per g. of the starch. The results obtained are shown in the following table.

TABLE 16

Value of MH with time intervals at different charge concentrations of starch in the saccharification reaction

| Starch concentration (% by weight) | Time lapse | | | |
|---|---|---|---|---|
| | 17 Hours | 24 Hours | 40 Hours | 48 Hours |
| 30% | 87(66) | 83(66) | 88(69) | 88(69) |
| 34% | 78(61) | 87(71) | 91(71) | 85(66) |
| 40% | 81(61) | 80(51) | 84(63) | 84(67) |

The figures given in the brackets represent the determined content of maltose in per cent by weight on the dry basis.

From the results of Table 16, it has been found tht a starch concentration of 34% gives favorable results and that at a starch concentration of 40% the increase in the MH and the maltose content are both depressive.

4. Investigation of the reaction time for the saccharification

Starch was liquefied routinely at a temperature of 84°– 87° C and at different starch concentrations of 30%, 34% and 40% by weight using 0.1% of a bacterial liquefying amylase (Spitase SP-1) and the saccharified at an initial pH of 6.0 and at 55° C using the amylase of Streptomyces hygroscopicus in such an amount of 400 u./g. The relationship of the saccharification time (hours) and MH is shown graphically in FIG. 6 of the attached drawing.

Figure 6:
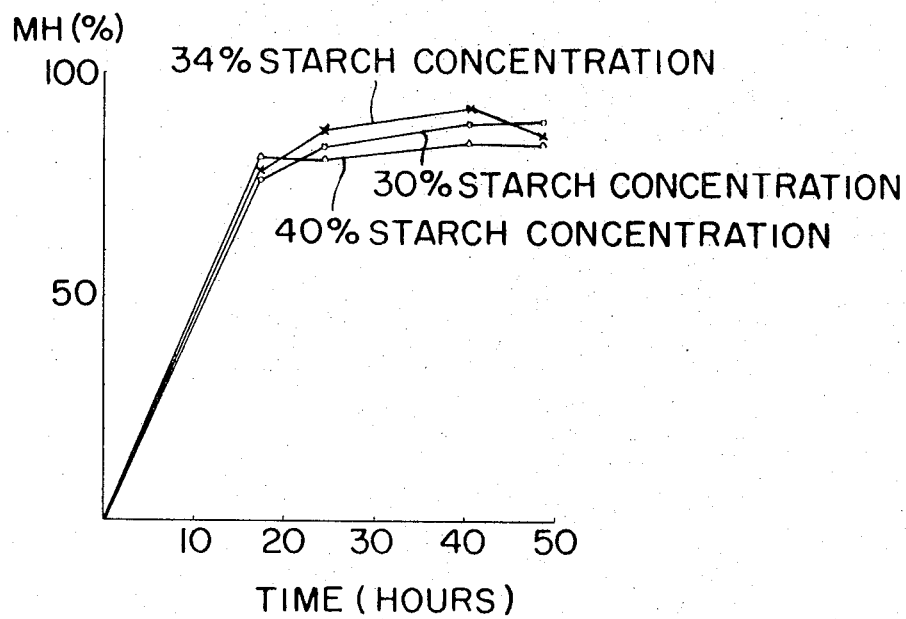

From FIG. 6, it may be seen that the MH does not increase or rather declines after 40 hours of the reaction at any of the starch concentrations. Therefore, it is believed that a saccharification time of 40 hours is appropriate for the saccharification of starch which is worked using the amylase of Streptomyces hygroscopicus.

As stated in the above, a starch material may be converted into an aqueous solution of the starch hydrolyzate, that is, the saccharification products of starch containing 70% or more maltose by weight on the dry basis, by treating the liquefyed starch in an aqueous dispersion with an amylase which is produced by the cultivation of a strain of the aforesaid particular Streptomyces species. This solution of the starch hydrolyzate with such a high maltose content may be used as a maltose material.

When maltose is catalytically hydrogenated with hydrogen in the presence of a nickel catalyst and especially Ranney nickel catalyst, it may be converted into maltitol, namely 4-0-[α-D-glucopyranosyl]-D-glucitol. This maltitol shows a degree os sweetness as much as that of cane sugar but is diet as be different from the cane sugar. That is to say, when maltitol is taken by man and animal, it is little assimilable in the body of man and animal. Moreover, maltitol has many advantages that it is little fermentable by the microorganisms but has a high ability of retaining moisture. This sugar alcohol, maltitol is expected to find extensive applications in the fields of food, pharmaceutical and cosmetics etc. For the production of maltitol, it is hithertofore usual to resort on such a method which comprises catalytically reducing a high purified grade of maltose with hydrogen in a known manner. However, the use of a highly purified grade of maltose as the starting material and the nickel catalyst used for the catalytic hydrogenation of maltose are both expensive, and hence it has been difficult to make at low cost maltitol having such many advantageous properties.

Hithertofore, maltose is usually produced by hydrolysing a starch material with malt or its enzymes. It is generally said that such starch hydrolyzate which is obtained by the saccharification of starch with malt has a maltose content of 40% or less. We carried out an experiment as follows: 1,000 parts of sweet potato starch and 2 parts of a known bacterial amylase were added to 1,200 parts of water, and the admixture was agitated well and then slowly added to 400 parts of hot water which was heated to 85°– 90° C under stirring. The mixture was held at a temperature of 85°– 87° C for 30 minutes, then cooled to 55°– 60° C, added with 5 parts of pulverised malt and subsequently maintained at pH 5 and at the same temperature for 2 hours to complete the saccharification of starch. In this experiment, the sugar composition of the starch hydrolyzate so produced containing 0.2% glucose, 26.1% maltose, 7.2% oligo-sugars and 66.5% dextrin, and its maltose content was very much lower. Accordingly, all the starch hydrolyzate which have hithertofore been available from the piror art saccharification of starch with malt are of a very low maltose, so that it needs complicated operations and is expensive to prepare the necessary highly purified maltose from such very crude starch hydrolyzate by any purification method.

The solution of the starch hydrolyzate containing at least 70% by weight of maltose on the dry basis which is obtained in the second aspect process of the present invention by reacting with a starch material an amylase of the particular Streptomyces produced by the first aspect of the present invention has normally a typical composition comprising 75.4% maltose, 3,1% glucose, 10.1% oligo-sugars and 11.4% dextrin. We have now found that the solution of the starch hydrolyzate of such a typical composition or a similar composition may suitably be hydrogenated with hydrogen in the presence of a nickel catalyst to effect the conversion of maltose into maltitol without difficulties, even if the maltose has previously not been isolated therefrom in a highly purified state; and further that from the starch hydrolyzate solution so hydrogenated there can readily be recovered a mixture of sugar alcohols comprising 70% or more of maltitol and 5% or less of sorbitol on the dry weight basis. This mixture of sugar alcohols is useful as a dietetic sweetening material as the whole, because the other ingredients present in said mixture are sorbitol, maltotriitol, maltotetraitol etc., which themselves are also dietetic sweetening materials. Thus, we have succeeded in achieving a commercial and inexpensive production of a mixture of sugar alcohols mainly composed of maltitol which is useful as a dietetic sweetening by starting from a starch, converting it into a maltose material with aid of the Streptomyces amylase and then hydrogenating the maltose material in the presence of a nickel catalyst.

According to the third aspect of the present invention, therefore, we provide a process for the production of a mixture of sugar alcohols mainly composed of maltitol, which comprises saccharifying a starch material, a starch material which has previously been at least partially hydrolyzed with a known liquefying amylase, or an amylose by reacting therewith in an aqueous dispersion an amylase which is produced by the cultivation of a strain of *Streptomyces albus*, *Streptomyces aureofaciens*, *Streptomyces hygroscopicus*, *Streptomyces hygroscopicus var. angustomyceticus*, *Streptomyces viridochromogenes*, *Streptomyces flavus* and *Streptomyces tosaensis* and which has such enzymatic activities and characteristics that the pH of the optimum activity is in the range of 4.5 – 5.0, the limit in the hydrolysis of starch by this amylase is no less than 75% of the theoretical maltose and the ratio of glucose to maltose produced from starch by the action of this amylase is no more than 0.06:1 by weight, until there is formed a starch hydrolyzate solution containing 70% or more of maltose and 4% or less of glucose on the dry weight basis, then catalytically hydrogenating the starch hydrolyzate solution with hydrogen in the presence of a nickel catalyst, and separating the nickel catalyst from the starch hydrolyzate solution whch has undergone the catalytic hydrogenation treatment, to recover the nickel catalyst and to give an aqueous solution of a mixture of sugar alcohols containing at least 70% of maltitol and up to 5% of sorbitol on the dry weight basis, which may, if desired, be concentrated to a syrup or dried.

In the third aspect process of the present invention, its saccharification step of starch which comprises reacting the above-defined Streptomyces amylase with a starch material may be carried out in the same manner as in the above-mentioned second aspect process of the present invention. Thus, as the starting starch material with which the Streptomyces amylase is caused to react, there may be employed any of available starch and starchy materials such as sweet potato, potato, corn starch, tapioca starch, rice and solubilised starch thereof. Amyloses of different molecular weights may be used for the starting starch material to be saccharified. The preparation of the Streptomyces amylase which may be used for the third aspect process of the present invention is worked as stated for the above-mentioned first aspect process of the present invention. Furthermore, the use of the Streptomyces amylase and the reaction thereof with a starch material to effect the saccharification of starch may also be operated in the same manner as stated for the above-mentioned second aspect process of the present invention.

In the third aspect process of the present invention, the saccharification step by the reaction of the Streptomyces amylase with starch may similarly be allowed to proceed until an aqueous solution of saccharification products of starch, that is, the starch hydrolyzate solution containing 70% or more or less of maltose (dry basis) is formed as the reaction mixture, when the saccharifying reaction is deemed as having been completed, whereupon the starch hydrolyzate solution is heated to inactive the enzyme. The starch hydrolyzate solution may then be filtered or centrifuged to remove the insoluble solid matter therefrom, if desired. The saccharified starch solution may also be concentrated, if desired. The starch hydrolyzate solution may further be subjected to de-coloring and/or desalting treatments, for example, by means of active carbon and/or known de-coloring and/or de-salting ion-exchange resins. Although the starch hydrolyzate solution from the saccharification step of the present process may immediately be passed to the step of the catalytic hydrogenation, it is preferred to previously desalt, decolorise and concentrate the said starch hydrolyzate solution to a solid content of 50 – 60% by weight before said solution is subjected to the hydrogenation in the present process. If desired, the starch hydrolyzate solution may further be subjected to such a treatment as to increase the maltose content thereof, before said solution is passed to the subsequent catalytic hydrogenation step. For the means of increasing the maltose in the starch hydrolyzate solution, there may be employed, for example, a method of adding an organic solvent such as methanol, ethanol etc., to the starch hydrolyzate solution to precipitate the oligo-sugars and dextrin therefrom, a method of treating the solution with active carbon, or a method of ultra-filtering the solution or any other known suitable method. In case such starch hydrolyzate solution which has undergone the treatment of increasing the maltose content thereof is fed into the subsequent catalytic hydrogenation step in the present process, the final mixture of sugar alcohols obtained may naturally have an increased maltitol content.

Explanation is now made of the step of the catalytic hydrogenation according to the third aspect process of the present invention.

To the starch hydrolyzate solution which is resulted from the above-mentioned saccharification step and occasionally has been de-salted, de-colorised and/or concentrated by a suitable means is now added a nickel hydrogenation catalyst for suitably in such a proportion of 5% by weight of the sugar content of the solution. For the nickel catalyst available for this hydrogenation purpose, it is preferred to employ a Raney nickel T-1 which has been prepared by a method of Dominguez et al as described in the "Journal of Organic Chemistry" Vol. 26, page 1,635 (1961). In addition to the Raney nickel, nickel on diatomaceous earth, nickel formate and others may be used as the catalytic hydrogenation catalyst in the present process. In the use of Raney nickel T-1, it is convenient that the starch hydrolyzate solution is at first adjusted to an initial pH of 9.0 and then undergoes the catalytic hydrogenation reaction at a reaction temperature of 100°– 150° C for 2 – 4 hours under a hydrogen pressure of 100 – 150 kg/cm² (gauge) in a known manner. Simple, preliminary tests may teach suitable hydrogenation conditions for the other types of nickel catalyst.

After the hydrogenation proceeds to completion, the hydrogenated, starch hydrolyzate solution is filtered or centrifuged to separate and recover the nickel catalyst therefrom. The recovered catalyst may be added to a further batch of the starch hydrolyzate solution which is to be reduced in the next run of the catalytic hydrogenation. In this way, the nickel catalyst may be recovered and used repeatedly 5 – 6 times for successive runs of the hydrogenation. Residual amount of reducing sugar as defined later which is determined for the hydrogenated starch hydrolyzate solution at the end of the hydrogenation step is normally at 0.2% in the first run of the hydrogenation step which is effected with the fresh nickel catalyst, and then it gradually increases to about 1.0% in the fifth to sixth run which is effected with the recovered and re-used nickel catalyst.

The completely hydrogenated, starch hydrolyzate solution so obtained and freed from the nickel catalyst may then be de-salted out by means of a known de-salting ion-exchange resin and may be concentrated by evaporation of water to give an aqueous syrup containing the mixture of sugar alcohols comprising 70% or more of maltitol and 5% or less of sorbitol on the dry weight basis. If desired, this concentration may be done to such an extent as to give a dry mixture of the sugar alcohols.

In order to minimize the total quantity of the nickel catalyst which should be required in the catalytic hydrogenation step through the successive runs of the third aspect process of the present invention, it is desirable that the catalyst once used is recovered from the reaction mixture in a run and then re-used in the next run. In the re-use of the recovered catalyst, however, when the quantity of the catalyst loaded in the starch hydrolyzate solution is too small to enable the desired hydrogenation of the maltose and glucose to take place, there can be involved undesired side-reactions due to that the reaction conditions employed are then at a relatively high temperature and pressure, deteriorating the quality of the final product of the present process. On the other hand, in case the quantity of the catalyst loaded is in excess, a loss of the catalyst during the recovery thereof is too large and disadvantageous from the view-point of economic. During the re-use of the recovered catalyst, therefore, it is desirable that the quantity of the catalyst loaded in the starch hydrolyzate solution in a run is of a required but minimum one. When the catalyst is recovered and re-used repeatedly, the activity and quantity of the recovered catalyst is gradually decreased with the times of re-use. When the recovered catalyst has been re-used some times in some successive runs, the recovered catalyst has exhausted to show at last a decreased catalytic activity which is not sufficient to enable the desired reactions to proceed at a satisfactory rate, causing the undesired side-reactions and leading to a deterioration in the quality of the final product. When the recovered catalyst has exhausted to show such decreased activity, further re-use thereof must be stopped of course. However, this exhausted, recovered catalyst still shows a residual catalytic activity, and it is uneconomic to discard this exhusted recovered catalyst immediately as a waste. The present inventors have now found that the hydrogenation step of the present process can normally and successfully be performed over many successive runs at a satisfactory rate but without involving the undesired side-reactions, by supplementing a small proportion of a fresh nickel catalyst to the exhausted, recovered catalyst and re-using the so re-activated, recovered catalyst in further successive runs of the hydrogenation phase. In other words, by supplementing a small proportion of a fresh nickel catalyst to the recovered catalyst which has been exhausted due to the re-use in several successive runs of the hydrogenation step, we have succeeded in ensuring that the hydrogenation step can normally be performed in prolonged successive runs thereof using the minimized quantity of the nickel catalyst which is repeatedly recovered re-used and re-activated by the addition of a small proportion of fresh nickel catalyst.

From the view-point of economic, the proportion of a fresh nickel catalyst supplemented should also be of a required but minimum one, and then in order to ensure a satisfactory repeated use of the recovered catalyst with continuing to provide the final product of good quality, it is necessary to schedule appropriately the time for the supplement of the fresh catalyst. As to when the catalytic hydrogenation of the starch hydrolyzate solution is carried out using the above-mentioned Raney nickel T-1, we have investigated to determine the minimum required quantity of the nickel catalyst to be loaded, the necessary proportion of fresh nickel catalyst to be supplemented and the time for the addition of the supplemental amount of the fresh catalyst, by checking the residual amount of reducing sugars as defined below for the starch hydrolyzate solution which has been hydrogenated thoroughly. The residual amount of reducing sugars as referred to above is calculated by the following equation:

$$\text{"Residual amount of reducing sugars"} = \frac{\begin{pmatrix}\text{Amount of reducing sugars present in the starch}\\\text{hydrolyzate solution at the completion of the}\\\text{catalytic hydrogenation}\end{pmatrix}}{\begin{pmatrix}\text{Amount of reducing sugars present in the starch}\\\text{hydrolyzate solution prior to the catalytic}\\\text{hydrogenation}\end{pmatrix}} \times 100$$

where "Amount of reducing sugar" represents the total quantity of reducing sugars calculated as maltose as measured by the Somogyi's titration method.

The extent of the catalytic hydrogenation may be estimated also by "Degree of conversion (%)" which is defined as follows:

"Degree of conversion (%)" = 100 − (% "Residual amount of reducing sugars" as defined above).

Figure 7:
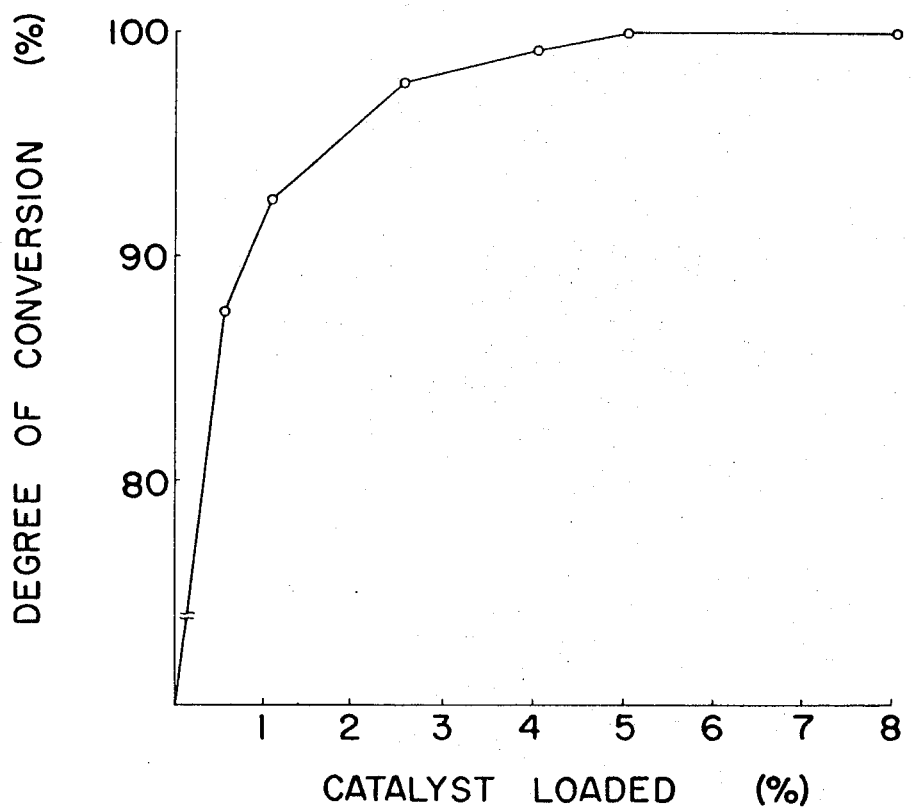

The data from our investigation are shown graphically in FIG. 7 which represents the relationship of the quantity of the catalyst loaded (% by weight based on the amount of reducing sugars present in the starch hydrolyzate solution) to the degree of conversion (%) at which the hydrogenation has proceeded to substantially a maximum in 3 hours at a temperature of 130° C in the step of catalytic hydrogenation of the starch hydrolyzed solution according to the third aspect process of the present invention. From the curve of FIG. 7, it may be seen that the proportion of the catalyst loaded is necessary to be at least 4% by weight of the amount of reducing sugars of the starch hydrolyzate solution in order to permit the hydrogenation to proceed until the "degree of conversion" is 99% (i.e., when the "residual amount of reducing sugars" is 1%), that a loaded proportion of the catalyst of 5% is required at minimum to give a degree of conversion of approximately 100% (i.e., when the "residual amount of reducing sugars" is 0.2%) and that no more improvement in the degree of conversion can be obtained even when the loaded quantity of the catalyst is in excess of 5%. Thus, when the catalytic hydrogenation of the starch hydrolyzate solution is effected with a loaded proportion of the catalyst which is more than 5% by weight of the amount of reducing sugar, there can be obtained substantially no improvement over the 5% loading of the catalyst. In consequence, it can be decided that the necessary minimum loading of the catalyst should be 5% by weight of the amount of reducing sugars present in the starch hydrolyzate solution to be hydrogenated.

We have made another series of tests. When the catalyst is loaded in the necessary minimum load proportion of 5% in the first run of the catalytic hydrogenation of the starch hydrolyzate solution, then recovered and re-used in the subsequent successive runs of the hydrogenation phase with recovering the catalyst as much as possible from each run, we have found the re-use of the recovered catalyst may be repeated e.g. for the 5 – 6 successive runs of the hydrogenation phase without decreasing appreciably the degree of conversion of the starch hydrolyzate solution during the hydrogenation and without supplementing any amount of the fresh catalyst, although the catalyst is lost a little during the recovery thereof in each run. For instance, in the sixth run, the residual amount of the reducing sugar approached 1% or less in the starch hydrolyzate solution at the completion of the catalytic hydrogenation thereof. Then, if the supplement of a fresh catalyst is made in a small proportion of 1 – 3% by weight based on the amount of reducing sugar present in the starch hydrolyzate solution to be hydrogenated, the recovered catalyst which has exhausted but is re-activated by the addition of the supplemented proportion of the fresh catalyst may be re-used again in further runs of the catalytic hydrogenation phase without showing any decrease in the degree of conversion below 99% in the further runs. For instance, when the supplement of a fresh catalyst is made in a proportion of 1% by weight, the times of possible re-use of the recovered catalyst which is re-activated by the supplement of the fresh catalyst increase with the proportion of the fresh catalyst supplemented in such a way: such an exhausted, recovered catalyst to which the fresh catalyst has been supplemented e.g. in a proportion of 1% by weight may again be re-used for further two runs, while such an exhausted, recovered catalyst to which the fresh catalyst has been supplemented e.g. in a proportion of 3% by weight may again be re-used for further 4 – 5 runs. Long successive re-use of the recovered catalyst may be made possible by supplementing the fresh catalyst in a proportion of 1% to the exhausted, recovered catalyst to reactivate the latter, re-using again two times the recovered catalyst so reactivated, further supplementing the fresh catalyst in another proportion of 1% to the recovered catalyst whch was once reactivated but has again been so exhausted through the two re-uses thereof that the degree of conversion resulted from the subsequent re-use thereof would decrease below 99%, and then re-using twice the again reactivated, recovered catalyst and repeating the supplement of 1% proportion of the fresh catalyst and further two re-uses of the recovered catalyst to which the supplement of the fresh catalyst has been made, and so on.

Moreover, we have found that the catalytic hydrogenation of the starch hydrolyzate solution is required to proceed to such an extent that the degree of conversion is 99% or more at the completion of the hydrogenation phase, in order to provide a final product of a good quality, and therefore that the supplement of the fresh catalyst to the exhausted, recovered catalyst is required to be made in the run next to such a run where the degree of conversion has decreased to 99% or thereabout. From the above researches, we have appreciated that in order to achieve repeated recovery and re-use of the nickel catalyst in an efficient and economic way it is advantageous to load the fresh nickel catalyst initially in the first run of the catalytic hydrogenation of the starch hydrolyzate solution in such a proportion of 5% by weight on the basis of the amount of reducing sugars of said solution; to repeatedly recover and re-use the catalyst (through successive 5 – 6 runs of the catalytic hydrogenation phase) for catalytically hydrogenating the successive batches of the starch hydrolyzate solution; to supplement a fresh catalyst in a proportion of 1 – 3% by weight (on the basis of the amount of reducing sugars of the starch hydrolyzate solution) to the recovered catalyst when the latter recovered catalyst has been exhausted to such an extent that the degree of conversion obtained therewith has decreased to 99% or thereabout, that is to say, to such an extent that the residual amount of the reducing sugars has approached approximately 1% in the starch hydrolyzate solution as measured even at the completion of the hydrogenation phase; to re-use again the recovered catalyst to which the fresh catalyst has been supplemented; and to repeat such recovery, supplement and reuse of the catalyst.

This may be evident from the following description. We have made research to find out the relationship of different proportions of the fresh catalyst supplemented (in per cent by weight on the basis of the amount of reducing sugars of the starch hydrolyzate solution as measured by the Somogyi's titration method) to the exhausted recovered catalyst; the number of further runs of the catalytic hydrogenation of the starch hydrolyzate solution which are possible to be satisfactorily effected using the recovered catalyst which is reactivated by the supplement of the fresh catalyst; and averages of the catalyst loading for each run. The results obtained are shown in the following table.

TABLE 17

| Supplemented proportion of fresh catalyst (% by weight) | Number of further possible runs | Average of catalyst loading for each run (% by weight) |
| --- | --- | --- |
| 0.5% | 0 | 0.91% |
| 1.0% | 2 | 0.75% |
| 2.0% | 3 | 0.78% |
| 3.0% | 4 | 0.80% |
| 4.0% | 5 | 0.82% |
| 5.0% | 6 | 0.83% |

Referring to Table 17, the average of catalyst loading for each run was calculated by the following equation:

$$\frac{5\% \text{ (i.e. the initial load of the catalyst for the first run)} + \text{(supplemented proportion \% of fresh catalyst)}}{6 \text{ (i.e. the number of runs without supplement of fresh catalyst)} + \text{(Number of further possible runs)}}$$

From the results of Table 17, it has been found that when the supplemented proportion of the fresh catalyst is in the range of 1.0 – 3.0%, the average of the catalyst loading for each run can be at minimum as compared to the other cases where the fresh catalyst is supplemented in the lower and higher proportions of 0.5% and 4.0%.

In carrying out the step of the catalytic hydrogenation of the starch hydrolyzate solution in accordance with the third aspect process of the present invention, therefore, it is economical very much advantageous to load the fresh nickel catalyst initially in a proportion of 5% by weight on the basis of the amount of reducing sugars of the starch hydrolyzate solution in the first run of the catalytic hydrogenation phase of the process, to effect the hydrogenation of the first batch of the starch hydrolyzate solution for the first run, to repeatedly recover and re-use the nickel catalyst in the second and subsequent several runs of the catalytic hydrogenation, to supplement the fresh catalyst in a proportion of 1 – 3% by weight (on the basis of the amount of reducing sugars in the starch hydrolyzate solution) to the recovered catalyst when the latter recovered catalyst has been exhausted to such an extent that the residual amount of the reducing sugars approaches approximtely 1% in the starch hydrolyzate solution at the completion of the hydrogenation phase in one run, and then to effect the next run hydrogenation using the re-activated, recovered catalyst to which the fresh catalyst has been supplemented.

According to a preferred embodiment of the third aspect process of the present invention, therefore, we provide a process for the production of a mixture of sugar alcohols mainly composed of maltitol, which comprises saccharifying a starch material, a starch material which was previously liquefyed by a known liquefying amylase, or an amylose by reacting therewith in an aqueous dispersion an amylase which is produced by the cultivation of a strain of *Streptomyces albus*, *Streptomyces aureofaciens*, *Streptomyces hydroscopicus*, *Streptomyces hygroscopicus var. angustomyceticus*, *Steptomyces viridochromogenesa*, *Streptomyces flavus* and *Streptomyces tosaensis* and which exhibits such enzymatic activites and characteristics that the pH of the optimum activity is in the range of 4.5 – 5.0, the limit in the hydrolysis of starch by this amylase is more than 75% of the theoretical maltose and the ratio of glucose to maltose produced from starch by the action of this amylase is less than 0.06:1 by weight, until there is formed the starch hydrolyzate solution containing at least 70% of maltose and up to 4% of glucose on the dry weight basis, loading initially therein a nickel catalyst in a proportion of about 5% by weight based on the amount of reducing sugars present in said starch hydrolyzate solution to be hydrogenated in the first run of the catalytic hydrogenation, catalytically hydrogenating the first batch of the starch hydrolyzate solution in the first run in the presence of the loaded nickel catalyst, separating the nickel catalyst from the hydrogenated, starch hydrolyzate solution to recover the nickel catalyst and to give an aqueous solution of a mixture of sugar alcohols containing at least 70% of maltitol and up to 5% of sorbitol on the dry weight basis, re-using the recovered catalyst to load in a second bath of the starch hydrolyzate solution to be hydrogenated in the second run of the hydrogenation; effecting the second run of the hydrogenation in the same manner as in the first run; effecting successively several further runs of the catalytic hydrogenation with further batches of the starch hydrolyzate solution while repeating the recovery and re-use of the nickel catalyst in each of the second run and these further runs; when a recovered catalyst separated from the last run of these further runs has been exhausted to such an extent that the residual amount of the reducing sugars in the hydrogenated starch hydrolyzate solution approaches about 1% as determined at the completion of the hydrogenation of this last run, supplementing to this exhausted, recovered catalyst an amount of a fresh nickel catalyst in a proportion of 1 – 3% by weight based on the amount of reducing sugars present in the starch hydrolyzate solution to be hydrogenated; loading the recovered catalyst which has exhausted and re-activated by the supplement of the fresh catalyst, into another batch of the starch hydrolyzate solution to be hydrogenated in a run next to the above-mentioned last run; effecting this next run of the catalytic hydrogenation; and subsequently performing more further runs of the hydrogenation successively for more further batches of the starch hydrolyzate solution while repeating the recovery and re-use of the catalyst in the more further runs of the catalytic hydrogenation and with occasionally conducting the supplement of a fresh nickel catalyst to the recovered catalyst at each time when the recovered catalyst as separated from one run has been exhausted to such an extent that the residual amount of the reducing sugars in the hydrogenated starch hydrolyzate solution approaches 1% as determined at the completion of the hydrogenation in that one run.

The present invention is now illustrated with reference to the following Examples. Examples 1 to 8 are illustrative of the first aspect process of the present invention. Examples 9 – 16 are illustrative of the second aspect process of the present invention, and Examples 17 – 23 are illustrative of the third aspect process of the present invention.

Example 1

A strain of *Streptomyces hygroscopicus* identified as F.R.I. 602 or A.T.C.C. 21722 was inoculated to 9 litres of a seed medium comprising 2% corn meal, 1% wheat embryo and 0.5% ferma media, adjusted to pH 7.0, and the incubation was made at 28+C for 24 hours in a jar-fermenter with agitating and aeration to prepare a seed culture. On the other hand, 300 litres of a production medium of such composition comprising 3% corn starch, 1% skimmed milk, 0.2% potassium dihydrogen phosphate, 0.05% magnesium sulfate, 0.01% manganese sulfate and a small proportion of defoaming agent were charged in a 600 l. capacity fermenter, sterilized at 121° C for 30 minutes and cooled. The seed culture prepared in the above was then inoculated to the sterilized production medium, and production medium was incubated at 28° C for 85 hours with aeration and agitation. The resulting culture broth was filtered to give the culture filtrate which was subsequently concentrated below 40° C under reduced pressure to liquid volume of one-fifth times the original volume. To the concentrate was then added a 2-fold larger volume of cold ethanol, precipitating the amylase which had been produced and accumulated in the culture broth. Drying of the precipitate gave 341 g. of a crude enzyme which showed a potency of 43,800 units/g.

EXAMPLE 2

100 ml. portions of medium having the same composition employed in Example 1 were placed in shaking flasks of a 500 ml. capacity and sterilized. *Streptomyces hygroscopicus* (ATCC. 21722) was inoculated thereto and shake-cultured at 28° for 24 hours to prepare a seed culture. On the other hand, 20 l. of a production medium comprising 12% soluble starch, 3% defatted soybean meal, 0.2% potassium dihydrogen phosphate adjusted to pH 7.0 was charged in a jar-fermenter of a 30 l. l. capacity, sterilized and cooled. To this sterilized production medium was inoculated the seed culture, and the cultivation was made at 35° C for 90 hours. The culture broth obtained was then treated in the same manner as in Example 1 to give 77 g. of crude amylase which showed a potency of 45,000 u./g.

EXAMPLE 3

A strain of *Streptomyces viridochromogenes* identified as F.R.I. 603 and ATCC. 21724 was cultivated in the same manner as in Example 2 in a production medium comprising 8.4% corn meal, 2% polypeptone and 0.2% potassium dihydrogen phosphate, adjusted to pH 7.0. From the resulting culture broth there was recovered 28 g. of a crude enzyme which showed a potency of 22,000 u./g.

EXAMPLE 4

A strain of *Streptomyces albus* identified as F.R.I. 604 and ATCC. 21725 was cultivated in the same manner as in Example 2 in a production medium comprising 9.4% soluble starch, 1.3% fish meal and 0.2% potassium dihydrogen phosphate, adjusted to pH 7.0. From the culture broth there was recovered 53 g. of a crude enzyme which showed a potency of 10,000 u./g.

EXAMPLE 5

A strain of *Streptomyces hygroscopicus* var. angustomycetes identified as F.R.I. 607 was cultivated in liquid in the same manner as in Example 2 to give 55 g. of a crude enzyme which showed a potency of 15,000 u./g.

EXAMPLE 6

*Streptomyces tosaensis nov. sp.* identified as ATCC 21723 was cultivated in the same manner as in Example 2 to give 72 g. of a crude enzyme which showed a potency of 38,000 u./g.

EXAMPLE 7

A strain of *Streptomyces aureofaciens* identified as F.R.I. 606 was cultivated in the same manner as in Example 7 to give 26 g. of a powder of crude enzyme which showed a potency 29,000 u./g.

EXAMPLE 8

A strain of *Streptomyces flavus* identified as F.R.I. 605 was cultivated in a culture medium of the same composition as that of the culture medium employed in Example 4, affording 38 g. of a powder of crude enzyme which had a potency 30,000 u./g.

EXAMPLE 9

To an aqueous dispersion of 9 Kg. of potato starch in 12 l. of tap water which was adjusted to at an initial pH 6.0 by addition of sodium hydroxide was added 0.1% of a known bacterial liquefying amylase (available commercially as a product of trade name "Spitase" produced by Nagase Sangyo Co. Ltd., Japan). The resulting mixture was added dropwise into 18 l. of hot water while the temperature was maintained at 70° – 73° C, so that the liquefaction of the starch was completed. The liquefying amylase was inactivated by heating the solution at 100° C for 5 minutes after the completion of the liquefaction phase. When the solution had then cooled to a liquid temperature of 55°C, the crude amylase of the streptomyces as prepared in Example 1 was added thereto in an amount of 400 units per g. of the starch. the mixture was then adjusted to at an initial pH 6.0 and held at 55° C for 40 hours to complete the saccharifying reaction. After the completion of the saccharification, the reaction mixture was filtered, routinely decolorised with active carbon and then de-salted by means of a known de-salting ion-exchange resin. Thereafter, the mixture so treated was concentrated by evaporation of water in vacuo to give 10 Kg. of a clear and colorless syrup of starch hydrolyzate comprising 3.6% glucose, 72.5% maltose, 10.3% maltotriose and 13.6% dextrin (the water content 25% by weight) which was useful as a liquid natural sweetening material mainly composed of maltose.

EXAMPLE 10

9 Kg. of sweet potato starch was dispersed in 12 l. of tap water. To the dispersion of starch was added 0.1% of a known bacterial liquefying amylase after adjustment to pH 6.0. The starch dispersion was then added dropwise to 18 l. of hot water while the temperature of the mixture was maintained at 84° – 87° C, so that the dextrinization of the starch was completed. The bacterial liquefying amylase was then inactivated by heating at 100° C for 5 minutes. When the liquefied starch solution had cooled to 55° C, the crude amylase of the streptomyces as prepared in Example 1 was added thereto in an amount of 400 units per g. of starch. The mixture was adjusted to pH 6.0 and then held at 55° C for 40 hours to effect the saccharifying reaction.

After the completed saccharification, the reaction mixture was filtered, routinely decolorised with active carbon and de-salted with a known de-salting ion-exchange resin. The mixture so treated was further concentrated by evaporation of water in vacuo to give 9.6 Kg. of a clear and colorless syrup of the starch hydrolyzate comprising 3.1% glucose, 73.6% maltose, 9.8% maltriose and 13.6% dextrin (the water content 25% by weight) which was useful as a liquid natural sweetening material mainly composed of maltose.

EXAMPLE 11

9 Kg. of corn starch was dispersed in 12 l. of tap water, and to the resulting dispersion was added 0.3% of a known bacterial liquefying amylase after adjusting to pH 6.0. The starch dispersion was then adjusted to pH 6.3 by addition of 0.02% calcium hydroxide and held at 92°–93°C to effect a primary liquefaction. After the completion of this primary liquefaction, the dispersion was heat-treated at 121°C for 10 minutes and subsequently added with 0.05% of the bacterial liquefying amylase. Secondary liquefaction was effected. After the completed liquefaction, the liquefying amylase was inactivated by heating at 100°C for 5 minutes. When the liquefied starch solution had cooled to 55°C, the crude amylase of the streptomyces as prepared in Example 1 was added thereto in an amount of 400 u./g. starch. The saccharifying reaction was carried out at pH 6.0 and at 55°C for 40 hours.

After the saccharification was finished, the reaction mixture was filtered, routinely de-colorised with active carbon and de-salted with a de-salting ion-exchange resin and finally concentrated until there was obtained 10.5 Kg. of a clear and colorless syrup of starch hydrolyzate comprising 4.1% glucose, 71.3% maltose, 11.7% maltotriose and 12.9% dextrin (the water content 25%) which was useful as a liquid natural sweetening material mainly composed of maltose.

EXAMPLE 12

15 Kg. of sweet potato starch was dispersed in water, and a bacterial liquefying amylase was added thereto in an amount of 1%. The liquefaction was carried out at a temperature of 84°–87°C and at pH 6.0, and subsequently the amylase of Streptomyces hygroscopicus was added in an amount of 400 u./g. starch. The saccharification reaction was carried out at an initial pH 6.0 and at 55°C for 40 hours, and the resulting saccharification mixture was then filtered to give 78 l. of the starch hydrolyzate.

The filtrate (78 l.) was concentrated to a volume of 42 l. and passed through a column of a de-coloring ion-exchange resin at the velocity of SV = 2 for the decolorisation. Thereafter, the culture filtrate was de-salted by passing through a column of an ion-exchange resin, so that 48 l. of the de-salted solution was afforded. The solution was concentrated to 26 l. and spray-dried to give 17 kg. of a dry powdery preparation comprising 5.2 % glucose, 70.6% maltose, 9.7% maltotriose, 10.5% dextrin and 4.0% water which was useful as a dietetic and natural sweetening mainly composed of maltose.

EXAMPLE 13

9 Kg. of sweet potato starch was dispersed in 12 l. of tap water, adjusted to pH 6.0 and added with 0.1% of a bacterial liquefying amylase. The mixture was then added dropwise into 18 l. of hot water while the temperature of the admixture was maintained at 84°–87°C. In this way, the liquefaction of starch was finished. Thereafter, the bacterial liquefying amylase was inactivated by heating at 100°C for 5 minutes. When the solution have had a temperature of 65°C upon standing, the solution was added with a culture filtrate which contained the amylase of Streptomyces hygroscopicus, in an amount of 400 u. per g. of starch. After the temperature of the solution was adjusted to 55°C, the saccharification reaction was carried out at an initial pH of 6.0 and at 55°C for 40 hours.

The culture filtrate containing the amylase of Streptomyces hygroscopicus employed in this Example was prepared in the following manner. Streptomyces hygroscopicus (ATCC. 21722) was shake-cultured at 28°C for 24 hours in 900 ml. of a medium comprising 2% corn meal, 2% wheat embryo, 0.5% ferma media, pH 7.0 in a 2 l. jar-fermenter with aeration and agitation to prepare the seed culture. On the other hand, 30 l. of a production medium comprising 3% corn starch, 1% defatted skimmed milk, 0.2% potassium dihydrogen phosphate, 0.05% magnesium sulfate, 0.01% manganese sulfate together with a suitable amount of a defoaming agent was placed in a 60 l. fermentation tank, sterilized at 121°C for 30 minutes and cooled. To this sterilized production medium was added the above-mentioned seed culture, and the incubation was carried out at 28°C for 85 hours with aeration and agitation. The resulting culture broth was filtered to give 27 l. of the culture filtrate which showed a potency of 2,000 u./ml.

The above saccharification reaction was finished in the aforesaid way, and the resulting reaction mixture was filtered and routinely de-colorised with active carbon and de-salted with a de-salting ion-exchange resin. The de-colorised and de-salted reaction mixture was concentrated by evaporation of water to yield 10.6 kg. of a colorless and clear syrup comprising 4.2% glucose, 74.2% maltose, 9.8% maltotriose and 11.8% dextrin (the water content 25%) which was useful as a dietetic and natural sweetening material mainly composed of maltose.

EXAMPLE 14

The process of Example 13 was repeated in the same manner except that the culture filtrate prepared from the culture of Streptomyces hygroscopicus was replaced by such a purified amylase preparation of Streptomyces hydroscopicus which was made by adding ammonium sulfate to the culture filtrate, thus precipitating the crude amylase and then electro-dialysing it. 10.2 kg. of a colorless and clear syrup comprising 3.2% glucose, 74.0% maltose, 8.8% maltotriose and 14.0% dextrin (the water content 25%) was yielded, which was useful as a dietetic and natural sweetening material mainly composed of maltose.

The purified amylase preparation of Streptomyces hygroscopicus employed in this Example was made in the following manner. 10 l. of the culture filtrate which was obtained in Example 13 was added with ammonium sulfate to 60% saturation, and the precipitate formed was removed by centrifugation and then taken into 2 l. of water. The aqueous solution obtained was subjected to an electric dialysis with an ion-exchange resin at 5°C under such dialysing conditions that electric current was passed for 3 hours at a constant voltage of 10 V and at a maximum ampere of 5.2 A. In this way, the ammonium sulfate was removed to give a solution of the purified amylase.

EXAMPLE 15

The process of Example 12 was repeated in the same manner except that the dry powdery amylase of *Streptomyces hygroscopicus* was replaced by the precipitated amylase which was obtained merely by adding ethanol to the culture filtrate of *Streptomyces hygroscopicus*. This precipitated amylase was added to the starch dispersion in an amount of 400 u./g. starch. 17.4 g. of a powdery product comprising 3.0% glucose, 72.5% maltose, 8.5% maltotriose, 12.0% dextrin and 4.0% water was yielded, which was useful as a dietetic and natural sweetening mainly composed of maltose.

The precipitated amylase employed in this Example was not dried and was prepared in the following manner. 10 l. of the culture filtrate obtained in Example 13 was concentrated to a volume of one-fifth times the original volume and then added a twice volume of cold ethanol to give precipitate. The precipitate was used as an enzyme preparation without previously drying it.

EXAMPLE 16

12 Kg. of potato starch was dispersed in 14 l. of tap water, adjusted to pH 6.0 and then immediately added the amylase of *Streptomyces hygroscopicus* in an amount of 200 units per g. of the starch. The aqueous mixture was then added dropwise to 14 l. of hot water while holding at a temperature of 70° – 72° C to complete the liquefaction of starch. After this, when the mixture was allowed to cool down to 55° C, the mixture was added with a further amount of the amylase of *Streptomyces hygroscopicus* equivalent to 200 units per g. of starch. The saccharification reaction was carried out at 55° C for 48 hours.

When thee saccharification had been completed, the reaction mixture was filtered, routinely de-colorised with active carbon and de-salted with a de-salting ion-exchange resin. The de-colorised and de-salted solution was concentrated, affording a clear and colorless syrup comprising 4.9% glucose, 70.0% maltose, 9.2% maltotriose, 15.9% dextrin (the water content 25%) which was useful as a dietetic and natural sweetening material mainly composed of maltose.

EXAMPLE 17

6 Kg. of corn starch was dispersed in 8 l. of tap water, adjusted to pH 6.0 and then added 0.2% of the known bacterial liquefying amylase. The aqueous mixture was adjusted to pH 6.0 by addition of calcium hydroxide and then added dropwise into 6 l. of hot water. Primary liquefaction was carried out at 92°–93° C. After the completed primary dextrinization, the liquefied starch solution was heat-treated at 120° C. Secondary liquefaction was then carried out adding 0.05% of the same bacterial liquefying amylase.

When the liquefaction of starch was finished, the enzyme was inactivated by heating at 100° C for 5 minutes. When the liquefied starch solution had cooled to a liquid temperature of 55° C, the solution was added with the dry powder amylase preparation of *Streptomyces hygroscopicus* which was prepared in Example 1, in an amount of 400 units per g. of starch. The saccharification reaction was carried out at an initial pH of 6.0 and at a temperature of 55° C for 40 hours.

After the saccharification was completed in the above way, the reaction mixture was filtered to give 24 l. of a filtrate which was subsequently de-colorised and de-salted in a routine way. By concentrating the de-colorised and de-salted solution to a solid content of 50%, there was obtained a syrup of the starch hydrolyzate comprising 4.1% glucose, 71.3% maltose, 11.7% oligo-sugars and 12.9% dextrin. 250 g. of Raney nickel catalyst was added to said syrup, and the initial pH of the syrup was adjusted to pH 9.0 and the syrup was placed in an autoclave of a capacity of 30 l. and fitted with a stirrer. Hydrogen was fed into the autoclave so that the syrup was subjected to the catalytic hydrogenation reaction at 130° C for 3 hours and under a hydrogen pressure of 100 kg./cm$^2$. After the completed hydrogenation, the reaction mixture was freed from the catalyst. The separated or recovered catalyst was added to a second batch of the syrup of the starch hydrolyzate which was prepared in the next operation of the saccharification of starch, and the catalytic hydrogenation was repeated with the second batch of the syrup and under the same hydrogenation conditions as mentioned above.

The filtrate of the reaction mixture from the hydrogenation process was determined for the residual amount of the reducing sugars by the Somogyi's method. It was found that the residual amount of the reducing sugars as defined above was 0.21% in the filtrate, namely the catalyst-free reaction mixture which was obtained from the first run of the hydrogenation process. Further batches of the syrup of the starch hydrolyzate were hydrogenated in successive runs under the same hydrogenation conditions, and the recovery and re-use of the catalyst was repeated in these successive runs of the hydrogenation. The residual amount of the reducing sugars increased gradually as the runs succeeded, and it reached 1.03% in the catalyst-free reaction mixture which was obtained from the sixth run of the hydrogenation.

After this sixth run of the hydrogenation, 50 g. of a fresh Ranney nickel catalyst was supplemented to the recovered catalyst, and the recovered catalyst so re-activated was re-used in the seventh run of the hydrogenation process. The recovery and re-use of the catalyst was again performed in the more further runs of the hydrogenation process.

The reaction mixtures whhich were obtained from the successive runs of the hydrogenation process were each filtered, de-salted and concentrated to yield an aqueous, clear and colorless composition of the sugar alcohols which had a 75% solid content and comprised no less than 70% of maltitol and minor amounts of sorbitol, maltotriitol and others. This aqueous composition mainly composed of maltitol was obtained at a yield of about 6.6 kg. in each run of the above-mentioned hydrogenation procedure.

EXAMPLE 18

The procedure of Example 17 was followed using sweet potato starch in place of the corn starch, liquefying it in the routine way and then effecting the saccharification with a dry powdery preparation of the amylase of *Streptomyces hygroscopicus*. An aqueous syrup of the starch hydrolyzate comprising 3.1% glucose, 73.6% maltose, 10.2% olig-sugars and 13.4% dextrin was yielded, and this was catalytically hydrogenated, filtered, de-salted and concentrated in the same manner as in Example 17 to give an aqueous, clear and colorless mixture of sugar alcohol of a high maltitol content which comprised 70% of maltitol and minor proportions of sorbitol, maltotriitol and other, and had a solid content of 75%.

EXAMPLE 19

The process of Example 17 was repeated using potato starch in place of the corn starch, liquefying it routinely and saccharifying the liquefyed starch with the amylase of *Streptomyces hygroscopicus*.

An aqueous syrup containing the starch hydrolyzate mainly composed of maltose and comprising 3.6% glucose, 75.5% maltose, 10.3% oligo-sugars and 13.6% dextrin was obtained. This syrup was catalytically hydrogenated, filtered and concentrated in the same manner as in Example 17 to yield an aqueous, clear and colorless mixture of sugar alcohols which comprised 72% maltitol and minor proportions of sorbitol, maltotiitol and others and which had a solid content of 75% by weight.

EXAMPLE 20

The saccharification process of Example 17 was repeated except that the dry powdery preparation of the amylase of *Streptomyces hygroscopicus* was replaced by a culture filtrate which was obtained by merely filtering the culture broth of *Streptomyces hytroscopicus*. An aqueous syrup containing the starch hydrolyzate mainly composed of maltose and comprising 4.1% glucose, 72.3% maltose, 10.1% oligo-sugars and 13.5% dextrin was afforded. By subjecting this syrup to the catalytic hydrogenation under same conditions as in Example 17, there was yielded a composition of sugar alcohols comprising 71% of maltitol and minor proportions of sorbitol, maltotriitol and others.

EXAMPLE 21

When the catalytic hydrogenation of the syrup of the starch hydrolyzate was carried out in the same way as in the process of Example 17, the first run of the hydrogenation was operated with the loading of the Raney nickel catalyst in an amount of 5% by weight on the basis of the amount of the reducing sugars in said syrup. The catalyst was recovered and re-used successively in six runs of the hydrogenation process, and further reuse of the recovered catalyst was stopped. These successive six runs gave aqueous mixtures of the sugar alcohol having approximately the same composition, respectively.

EXAMPLE 22

When the catalytic hydrogenation of the syrup of the starch hydrolyzate was effected like to Example 17, the first run of the hydrogenation process was operated with the loading of 5% by weight of the Raney nickel catalyst based on the amount of reducing sugars of the syrup and the catalyst was recovered and re-used in successive six runs of the hydrogenation. The recovered catalyst from the sixth run was re-activated by the supplement of 3% (150 g.) of fresh Raney nickel catalyst based on the amount of reducing sugars of the syrup before it was re-used for the seventh run. The catalyst was again recovered and re-used in further runs of the catalytic hydrogenation process, each run affording aqueous mixtures of the sugar alcohols having the composition like to that obtained in Example 17.

EXAMPLE 23

100 g. of an amylose was dissolved in 3 l. of 0.2 N aqueous sodium hydroxide with heating, then cooled down to 65° C, adjusted to pH 6.0 and then added the amylase of *Streptomyces hygroscopicus* in an amount of 1,000 units per g. of the amylose. The saccharification reaction was carried out at 62° C for 40 hours. After the saccharification was completed, the enzyme was inactivated by heating. The reaction mixture was routinely filtered, de-colorised, de-salted and then concentrated to a solid content of 50% to give an aqueous syrup or solution containing the starch hydrolyzate comprising 1.0% glucose, 82.5% maltose and 16.5% oligo-sugars on the dry weight basis. This syrup (0.2 litres) was added with 4.5g. of Raney nickel catalyst, adjusted to an initial pH of 9.0 and then catalytically hydrogenated at a reaction temperature of 130° C for 3 hours and under a hydrogen pressure of 100 kg./cm$^2$. The reaction mixture was separated from the catalyst by filtration, de-salted and then concentrated to yield 120 g. of an aqueous composition of sugar alcohols mainly composed of maltitol and which had a solid content of 75% and comprised 80% maltitol, 2.5% sorbitol and the balance of maltotriitol and other products.

What we claim is:

1. A process for the preparation of saccharification products of starch mainly composed of maltose which is useful as a diet and natural sweetening material, which comprises liquefying and saccharifying a starch material including an amylose in aqueous dispersion by reacting therewith an amylase produced by cultivating a strain of *Streptomyces albus, Streptomyces aureofaciens, Streptomyces hygroscopicus, Streptomyces hygroscopicus var. augustomyceticus, Streptomyces viridochromogenes, Streptomyces flavus* and *Streptomyces tosaensis* under aerobic conditions in a culture medium containing known carbon sources and nitrogen sources to produce and accumulate in the culture medium an amylase having such enzymatic activities and characteristics that the pH of the optimum activity is in the range of 4.5 – 5.0, the limit in the hydrolysis of starch by this amylase is no less than 75% of the theoretical maltose and the ratio of glucose to maltose produced from starch by the action of this amylase is no more than 0.06:1 by weight, until there is formed an aqueous solution of the saccharification products of starch containing at least 70% of maltose on the dry weight basis.

2. A process for the preparation of saccharification products of starch mainly composed of maltose which is useful as a dietetic and natural sweetening material, which comprises reacting a known liquefying amylase with a starch material in an aqueous dispersion to liquefy the starch, heating the resultant solution of the liquefied starch to inactivate the liquefying amylase, and then saccharifying the liquefied starch by reacting it in a known manner with an amylase which is produced by cultivating a strain of *Streptomyces albus, Streptomyces aureofaciens, Streptomyces hygroscopicus, Streptomyces hygroscopicus var. angustomyceticus, Streptomyces viridochromogenes, Streptomyces flavus* and *Streptomyces tosaensis* under aerobic conditions in a culture medium containing known carbon sources and nitrogen sources to produce and accumulate in the culture medium an amylase having such enzymatic activities and characteristics that the pH of the optimum activity is in the range of 4.5 – 5.0, the limit in the hydrolysis of starch by this amylase is no less than 75% of the theoretical maltose and the ratio of glucose to maltose produced from starch by the action of this amylase is no more than 0.06:1 by weight, until there is formed an aqueous solution of the saccharification products of starch, that is, the starch hydrolyzate containing at least 70% of maltose on the dry weight basis, heating the last solution to inactivate the Streptomyces amylase, and then, if desired, subjecing said solution of the starch hydrolyzate to filtration, concentration, de-coloration and/or de-salting process.

3. A process as claimed in claim 1 in which the amylase is produced by cultivating a strain of *Streptomyces hydroscopicus* identified as ATCC No. 21722 in a culture medium under aerobic conditions to produce and accumulate in the culture medium an amylase having such enzymatic activities and characteristics that the pH of the optimum activity is in the range of 4.5 – 5.0, the limit in the hydrolysis of starch by this amylase is 82% of the theoretical maltose and the ratio of glucose to maltose produced from starch by the action of this amylase is 0.055:1 by weight and said amylase is reacted with a starch material at about 55° C for about 40 hours.

4. A process for the production of a mixture of sugar alcohols mainly composed of maltitol which is useful as a dietetic sweetening material, which comprises saccharifying a starch material, an at least partially hydrolyzed starch material and an amylose by reacting therewith in an aqueous dispersion thereof an amylase produced by cultivating a strain of *Streptomyces albus*, *Streptomyces aureofaciens*, *Streptomyces hygroscopicus*, *Streptomyces hygroscopicus* var. *angustomyceticus*, *Streptomyces viridochromogenes*, *Streptomyces flavus* and *Streptomyces tosaensis* under aerobic conditions in a culture medium containing known carbon sources and nitrogen sources to produce and accumulate in the culture medium an amylase having such enzymatic activities and characteristics that the pH of the optimum activity is in the range of 4.5 – 5.0, the limit in the hydroliyis of starch by this amylase is no less than 75% of the theoretical maltose and the ratio of glucose to maltose produced from starch is no more than 0.06:1 by weight, until there is formed a starch hydrolyzate solution containing at least 70% of maltose and up to 4% of glucose on the dry weight basis, then catalytically hydrogenating the starch hydrolyzate solution with hydrogen in the presence of a nickel catalyst, and separating the nickel catalyst from the hydrogenated starch hydrolyzate solution to recover the nickel catalyst and to give an aqueous solution of a mixture of sugar alcohols containing at least 70% of maltitol and up to 5% of sorbitol on the dry weight basis, and then, if desired, concentrating the solution of a mixture of sugar alcohols to a syrup or to dryness.

5. A process as claimed in claim 4 in which the starch hydrolyzate solution from the saccharification step is processed by loading initially therein a nickel catalyst in a proportion of about 5% by weight based on the amount of reducing sugars present in said starch hydrolyzate solution to be hydrogenated in the first run of the catalytic hydrogenation, catalytically hydrogenating the first batch of the starch hydrolyzate solution in the first run in the presence of the loaded nickel catalyst, separating the nickel catalyst from the hydrogenated, starch hydrolyzate solution to recover the nickel catalyst and to give an aqueous solution of a mixture of sugar alcohols containing at least 70% of maltitol and up to 5% of sorbitol on the dry weight basis, re-using the recovered catalyst to load in a second batch of the starch hydrolyzate solution to be hydrogenated in the second run of the hydrogenation; effecting the second run of the hydrogenation in the same manner as in the first run; effecting successively several further runs of the catalytic hydrogenation with further batches of the starch hydrolyzate solution while repeating the recovery and re-use of the nickel catalyst in each of the second run and these further runs; when a recovered catalyst separated from the last run of these further runs has been exhausted to such an extent that the residual amount of the reducing sugars in the hydrogenated starch hydrolyzate solution approaches about 1% as determined at the completion of the hydrogenation of this last run, supplementing to this exhausted, recovered catalyst an amount of a fresh nickel catalyst in a proportion of 1 – 3% by weight based on the amount of reducing sugars present in the starch hydrolyzate solution to be hydrogenated; loading the recovered catalyst which has exhausted and re-activated by the supplement of the fresh catalyst, into another batch of the starch hydrolyzate solution to be hydrogenated in a run next to the above-mentioned last run; effecting this next run of the catalytic hydrogenation; and subsequently performing more further runs of the hydrogenation successively for more further batches of the starch hydrolyzate solution while repeating the recovery and re-use of the catalyst in the more further runs of the catalytic hydrogenation and with occasionally conducting the supplement of a fresh nickel catalyst to the recovered catalyst at each time when the recovered catalyst as separated from one run has been exhausted to such an extent that the residual amount of the reducing sugars in the hydrogenated starch hydrolyzate solution approaches 1% as determined at the completion of the hydrogenation in that one run.

6. A process as claimed in claim 4 in which the amylase is produced by cultivating a strain of *Streptomyces hydroscopicus* identified as ATCC No. 21722 in a culture medium under aerobic conditions to produce and accumulate in the culture medium an amylase having such enzymatic activities and characteristics that the pH of the optimum activity is in the range of 4.5 – 5.0, the limit in the hydrolysis of starch by this amylase is 82% of the theoretical maltose and the ratio of glucose to maltose produced from starch by the action of this amylase is 0.055:1 by weight and said amylase is reacted with the starch material.

\* \* \* \* \*